(12) United States Patent
Bryant

(10) Patent No.: US 12,018,141 B2
(45) Date of Patent: Jun. 25, 2024

(54) EXTRUSION COATING WITH ENHANCED PERFORMANCE VIA POLYMERIC BLENDS

(71) Applicant: Chevron Phillips Chemical Company LP, The Woodlands, TX (US)

(72) Inventor: James M. Bryant, Collinsville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 325 days.

(21) Appl. No.: 17/183,914

(22) Filed: Feb. 24, 2021

(65) Prior Publication Data

US 2022/0267576 A1 Aug. 25, 2022

(51) Int. Cl.
| | |
|---|---|
| C08L 23/06 | (2006.01) |
| B29C 48/00 | (2019.01) |
| B29C 48/154 | (2019.01) |
| C08L 23/04 | (2006.01) |
| B29K 23/00 | (2006.01) |

(52) U.S. Cl.
CPC ............ C08L 23/06 (2013.01); B29C 48/022 (2019.02); B29C 48/154 (2019.02); C08L 23/04 (2013.01); B29C 2948/9219 (2019.02); B29C 2948/922 (2019.02); B29C 2948/92647 (2019.02); B29K 2023/0625 (2013.01); B29K 2023/0633 (2013.01); C08L 2207/066 (2013.01)

(58) Field of Classification Search
CPC ..................................................... C08L 23/06
See application file for complete search history.

(56) References Cited

U.S. PATENT DOCUMENTS

| | | | |
|---|---|---|---|
| 4,465,812 A | 8/1984 | Moriguchi | |
| 4,525,257 A * | 6/1985 | Kurtz | .......................... C08J 5/18 |
| | | | 522/158 |
| 4,576,993 A | 3/1986 | Tamplin | |
| 4,705,829 A | 11/1987 | Kwack | |
| 6,300,271 B1 | 10/2001 | McDaniel | |
| 6,492,475 B1 | 12/2002 | Egashira | |
| 6,689,851 B1 | 2/2004 | Rowland | |
| 6,831,141 B2 | 12/2004 | McDaniel | |
| 6,887,819 B2 | 5/2005 | McDaniel | |
| 7,041,617 B2 | 5/2006 | Jensen | |
| 7,148,298 B2 | 12/2006 | Jensen | |
| 9,701,823 B2 * | 7/2017 | Landry, Jr. | .......... C08L 23/0815 |
| 2005/0153830 A1 * | 7/2005 | Jensen | .................... C08F 10/00 |
| | | | 502/103 |
| 2006/0281866 A1 * | 12/2006 | Oswald | ................. C09D 123/08 |
| | | | 525/240 |
| 2014/0342141 A1 * | 11/2014 | Cui | ....................... B29C 48/022 |
| | | | 428/220 |
| 2015/0175827 A1 | 6/2015 | Keshtkar | |

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
IUPAC Compendium of Chemical Terminology, 2nd Ed. 1997, pp. 1-1670.

* cited by examiner

Primary Examiner — Irina Krylova
(74) Attorney, Agent, or Firm — Conley Rose, P.C.

(57) ABSTRACT

A composition comprising a low density polyethylene (LDPE) and a peroxide-treated metallocene-catalyzed linear low density polyethylene (pmLLDPE), wherein the composition when extruded as a molten resin displays a neck-in value that is (i) decreased when compared to the neck-in value observed when using the LDPE alone, (ii) about equal to the neck-in value observed when using the LDPE alone, or (iii) increased by <10% of the neck-in value observed when using the LDPE alone. The composition when extruded as a molten resin displays a neck-in value that is decreased by ≥5% when compared with a neck-in value of an otherwise similar composition comprising the LDPE and a metallocene-catalyzed linear low density polyethylene (mLLDPE) that has not been peroxide-treated. The composition comprises 1-80 wt. % pmLLDPE. The pmLLDPE has a melt index of ≤0.9 g/10 min, when tested in accordance with ASTM D1238 under a force of 2.16 kg.

19 Claims, 6 Drawing Sheets

EXTRUSION COATING WITH ENHANCED PERFORMANCE VIA POLYMERIC BLENDS

TECHNICAL FIELD

This disclosure relates to polymeric compositions. More specifically, this disclosure relates to polymeric compositions comprising a blend of polymers having improved processability, and methods of making and using same.

BACKGROUND

Polyolefins are plastic materials useful for making a wide variety of valued products due to their combination of stiffness, ductility, barrier properties, temperature resistance, optical properties, availability, and low cost. One of the most valued products is plastic films. In particular, polyethylene (PE) is one of the largest volume polymers consumed in the world. It is a versatile polymer that offers high performance relative to other polymers and alternative materials such as glass, metal, or paper. Plastic films such as PE films are mostly used in packaging applications but they also find utility in the agricultural, medical, and engineering fields.

PE films are manufactured in a variety of grades that are usually differentiated by the polymer density such that PE films can be designated for example, low density polyethylene (LDPE), linear low density polyethylene (LLDPE), medium density polyethylene (MDPE), and high density polyethylene (HDPE), wherein each density range has a unique combination of properties making it suitable for a particular application.

A large number of extrusion coating applications utilize LDPE owing to its good processability characteristics. One drawback to the use of blends of LDPE polymers with other PE polymers is that the introduction of the second type of PE polymer often detrimentally impacts the process characteristics of LDPE. Thus, an ongoing need exists for improved PE blends having a user and/or application desired combination of physical properties and processability.

BRIEF SUMMARY

Disclosed herein is a composition comprising a low density polyethylene (LDPE) and a peroxide-treated metallocene-catalyzed linear low density polyethylene (pmLLDPE), wherein the composition when extruded as a molten resin displays a neck-in value that is (i) decreased when compared to the neck-in value observed when using the LDPE alone, (ii) about equal to the neck-in value observed when using the LDPE alone, or (iii) increased by less than about 10% of the neck-in value observed when using the LDPE alone.

Also disclosed herein is a method comprising blending a low density polyethylene (LDPE) and a peroxide-treated metallocene-catalyzed linear low density polyethylene (pmLLDPE) to form a polyethylene blend having a blend compatibility rating of 1; wherein the polyethylene blend comprises from about 1 wt. % to about 80 wt. % pmLLDPE, based on the total weight of the polyethylene blend; wherein the polyethylene blend is characterized by a $\Delta$MI of from about 4.5 to about 25; wherein the $\Delta$MI is defined as the absolute value of the difference between the melt index (MI) of the LDPE and the MI of the pmLLDPE; wherein the MI is expressed in g/10 min, and wherein the MI is measured in accordance with ASTM D1238 under a force of 2.16 kg.

Further disclosed herein is a method comprising extruding a polyethylene blend as a molten resin on an extruder to form an extrusion coating; wherein the polyethylene blend comprises a low density polyethylene (LDPE) and a peroxide-treated metallocene-catalyzed linear low density polyethylene (pmLLDPE); wherein the polyethylene blend has a blend compatibility rating of 1; wherein the LDPE has a melt index of greater than about 4.0 g/10 min, when tested in accordance with ASTM D1238 under a force of 2.16 kg; wherein the pmLLDPE has a melt index of equal to or less than about 0.9 g/10 min, when tested in accordance with ASTM D1238 under a force of 2.16 kg; and wherein the polyethylene blend when extruded as a molten resin displays a neck-in value that is (i) decreased when compared to the neck-in value observed when using the LDPE alone, (ii) about equal to the neck-in value observed when using the LDPE alone, or (iii) increased by less than about 10% of the neck-in value observed when using the LDPE alone.

Further disclosed herein is a method comprising extrusion blending a low density polyethylene (LDPE) and a peroxide-treated metallocene-catalyzed linear low density polyethylene (pmLLDPE) to form a molten resin having a blend compatibility rating of 1; wherein the LDPE has a melt index of greater than about 10 g/10 min, when tested in accordance with ASTM D1238 under a force of 2.16 kg; and wherein the pmLLDPE has a melt index of equal to or less than about 0.9 g/10 min, when tested in accordance with ASTM D1238 under a force of 2.16 kg; and coating the molten resin onto a substrate to form an extrusion coating; wherein the extrusion coating contacts the substrate; and wherein the extrusion coating has a neck-in value that is decreased by equal to or greater than about 40% of the neck-in value observed when using the LDPE alone.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
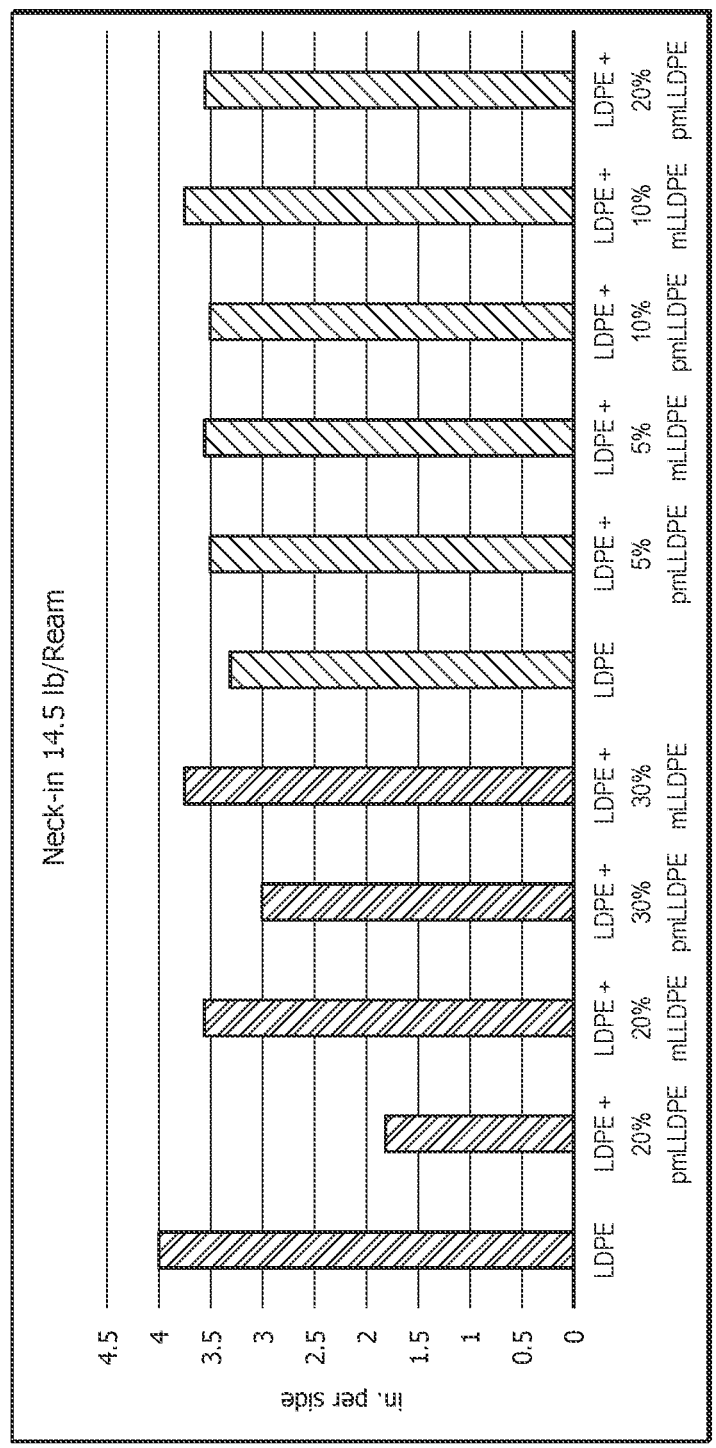
FIG. 1A is a plot of neck-in values for different polyethylene blends at a coating thickness of 1 mil.

It should be understood at the outset that although an illustrative implementation of one or more embodiments are provided below, the disclosed systems, methods, or both can be implemented using any number of techniques, whether currently known or in existence. The disclosure should in no way be limited to the illustrative implementations, drawings, and techniques illustrated below, including the exemplary designs and implementations illustrated and described herein, but can be modified within the scope of the appended claims along with their full scope of equivalents.

Disclosed herein are polymer blends and methods of making and using same. In an aspect, the polymer blend comprises an LDPE and an LLDPE. Such blends may display improved processability, as will be described in more detail later herein. Hereinafter, this disclosure will focus on a composition comprising an LDPE and an LLDPE which is referred to as a polyethylene blend (PEB).

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs. Further, unless otherwise required by context, singular terms shall include pluralities and plural terms shall include the singular.

Unless explicitly stated otherwise in defined circumstances, all percentages, parts, ratios, and like amounts used herein are defined by weight.

Further, certain features of the present invention which are, for clarity, described herein in the context of separate embodiments, may also be provided in combination in a single embodiment. Conversely, various features of the invention that are, for brevity, described in the context of a single embodiment, may also be provided separately or in any sub-combination.

If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system consisting of specific components; alternatively, consisting essentially of specific components; or alternatively, comprising the specific components and other non-recited components.

In this disclosure, while systems, processes, and methods are often described in terms of "comprising" various components, devices, or steps, the systems, processes, and methods can also "consist essentially of" or "consist of" the various components, devices, or steps, unless stated otherwise.

The term "about" as used herein means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" may mean within 10% of the reported numerical value, alternatively within 5% of the reported numerical value.

Although any methods, devices, and materials similar or equivalent to those described herein can be used in the practice or testing of the invention, the typical methods, devices, and materials are herein described.

In an aspect, the PEB as disclosed herein comprises a low density polyethylene (LDPE) and a peroxide-treated metallocene-catalyzed linear low density polyethylene (pmLLDPE).

In an aspect, the PEB blend comprises an LDPE. The LDPE may be a homopolymer, provided however that the homopolymer may optionally contain up to 5% of another alpha-olefin. Despite the potential presence of small amounts of other alpha-olefins, the LDPE is generally referred to as a polyethylene homopolymer.

In an aspect, an LDPE suitable for use in this disclosure may have a melt index (MI) of equal to or greater than about 4.0 g/10 min, alternatively equal to or greater than about 5.0 g/10 min, alternatively equal to or greater than about 7.5 g/10 min, alternatively equal to or greater than about 10 g/10 min, alternatively equal to or greater than about 12.5 g/10 min, alternatively equal to or greater than about 15 g/10 min, alternatively from about 4.0 g/10 min to about 17 g/10 min, alternatively from about 4.0 g/10 min to about 6.0 g/10 min, or alternatively from about 6.0 g/10 min to about 17 g/10 min, when tested in accordance with ASTM D1238 under a force of 2.16 kg. In some aspects, an LDPE suitable for use in this disclosure may have a melt index of from about 4.0 g/10 min to about 10 g/10 min, alternatively from about 4.6 g/10 min to about 10 g/10 min, alternatively from about 4.6 g/10 min to about 8.0 g/10 min, or alternatively from about 4.6 g/10 min to about 6.0 g/10 min, when tested in accordance with ASTM D1238 under a force of 2.16 kg.

For example, an LDPE suitable for use in this disclosure may have a melt index of about 5.1 g/10 min, when tested in accordance with ASTM D1238 under a force of 2.16 kg. In other aspects, an LDPE suitable for use in this disclosure may have a melt index of from about 10 g/10 min to about 20 g/10 min, alternatively from about 12 g/10 min to about 18 g/10 min, or alternatively from about 14 g/10 min to about 17 g/10 min, when tested in accordance with ASTM D1238 under a force of 2.16 kg. As another example, an LDPE suitable for use in this disclosure may have a melt index of about 16 g/10 min, when tested in accordance with ASTM D1238 under a force of 2.16 kg.

In an aspect, an LDPE suitable for use in this disclosure may have a density of from about 0.915 g/cc to about 0.924 g/cc, alternatively from about 0.919 g/cc to about 0.924 g/cc, or alternatively from about 0.915 g/cc to about 0.919 g/cc, as determined in accordance with ASTM D1505. In some aspects, an LDPE suitable for use in this disclosure may have a density of from about 0.915 g/cc to about 0.920 g/cc, alternatively from about 0.915 g/cc to about 0.919 g/cc, or alternatively from about 0.916 g/cc to about 0.918 g/cc, as determined in accordance with ASTM D1505. For example, an LDPE suitable for use in this disclosure may have a density of about 0.917 g/cc, as determined in accordance with ASTM D1505. In other aspects, an LDPE suitable for use in this disclosure may have a density of from about 0.920 g/cc to about 0.924 g/cc, alternatively from about 0.921 g/cc to about 0.924 g/cc, or alternatively from about 0.922 g/cc to about 0.924 g/cc, as determined in accordance with ASTM D1505. As another example, an LDPE suitable for use in this disclosure may have a density of about 0.923 g/cc, as determined in accordance with ASTM D1505.

In an aspect, an LDPE suitable for use in this disclosure may have a melting point of from about 100° C. to about 110° C., alternatively from about 100° C. to about 106° C., or alternatively from about 106° C. to about 110° C., as determined in accordance with ASTM D3418. In some aspects, an LDPE suitable for use in this disclosure may have a melting point of from about 100° C. to about 105° C., alternatively from about 101° C. to about 104° C., or alternatively from about 102° C. to about 104° C., as determined in accordance with ASTM D3418. For example, an LDPE suitable for use in this disclosure may have a melting point of about 103° C., as determined in accordance with ASTM D3418. In other aspects, an LDPE suitable for use in this disclosure may have a melting point of from about 105° C. to about 110° C., alternatively from about 106° C. to about 110° C., or alternatively from about 107° C. to about 109° C., as determined in accordance with ASTM D3418. As another example, an LDPE suitable for use in this disclosure may have a melting point of about 108° C., as determined in accordance with ASTM D3418.

In an aspect, an LDPE suitable for use in this disclosure may have a Vicat softening temperature of from about 85° C. to about 102° C., alternatively from about 86° C. to about 102° C., or alternatively from about 92° C. to about 102° C., as determined in accordance with ASTM D1525. In some aspects, an LDPE suitable for use in this disclosure may have a Vicat softening temperature of from about 85° C. to about 92° C., alternatively from about 86° C. to about 92° C., or alternatively from about 86° C. to about 90° C., as determined in accordance with ASTM D1525. For example, an LDPE suitable for use in this disclosure may have a Vicat softening temperature of about 87° C., as determined in accordance with ASTM D1525. In other aspects, an LDPE suitable for use in this disclosure may have a Vicat softening temperature of from about 92° C. to about 102° C., alternatively from about 96° C. to about 102° C., or alternatively from about 98° C. to about 102° C., as determined in accordance with ASTM D1525. As another example, an LDPE suitable for use in this disclosure may have a Vicat softening temperature of about 100° C., as determined in accordance with ASTM D1525.

An example of an LDPE homopolymer suitable for use in this disclosure includes without limitation an extrusion coating grade low density polyethylene that has generally the physical properties set forth in Table 1.

TABLE 1

| Properties | Typical Value | Test Method |
|---|---|---|
| Physical | | |
| Density, g/cc | 0.917 g/cc | ASTM D1505 |
| Melt Index, 190 C./2.16 Kg | 16 g/10 min | ASTM D1238 |
| Melting Point | 103° C. | ASTM D3418 |
| Vicat Softening Temperature | 87° C. | ASTM D1525 |
| Water Vapor Transmission Rate (WVTR) | 25 g/m$^2$/day | ASTM F1249 |
| Oxygen Transmission Rate (OTR) | 7200 cm$^3$/m$^2$/day | ASTM D3985 |

Another example of an LDPE homopolymer suitable for use in this disclosure includes without limitation another extrusion coating grade low density polyethylene that has generally the physical properties set forth in Table 2.

TABLE 2

| Properties | Typical Value | Test Method |
|---|---|---|
| Physical | | |
| Density, g/cc | 0.923 g/cc | ASTM D1505 |
| Melt Index, 190 C./2.16 Kg | 5.1 g/10 min | ASTM D1238 |
| Melting Point | 108° C. | ASTM D3418 |
| Vicat Softening Temperature | 100° C. | ASTM D1525 |
| WVTR | 18 g/m$^2$/day | ASTM F1249 |
| OTR | 7200 cm$^3$/m$^2$/day | ASTM D3985 |

The LDPE may be prepared using any suitable methodology for preparation of the polymer. For example, an LDPE suitable for use in the present disclosure may be prepared by radical polymerization of the ethylene monomer. Methods of preparing an LDPE are described for example in U.S. Pat. Nos. 4,465,812; 4,576,993; and 4,705,829; each of which is incorporated by reference herein in its entirety.

In an aspect, the LDPE can be present in the PEB in an amount of from about 20 wt. % to about 99 wt. %, alternatively from about 30 wt. % to about 90 wt. %, or alternatively from about 50 wt. % to about 80 wt. %, based on the total weight of the PEB.

In an aspect, the PEB blend comprises an LLDPE, for example a metallocene-catalyzed LLDPE, such as a single-site metallocene-catalyzed (mLLDPE), wherein the mLLDPE has been treated with peroxide to form a peroxide-treated metallocene-catalyzed linear low density polyethylene (pmLLDPE).

In an aspect, the PEB comprises pmLLDPE. In such aspect, the pmLLDPE can be obtained by contacting an LLDPE base resin (e.g., mLLDPE base resin) with an additive, such as for example a peroxide modifier. As used herein, a "base resin" refers to a resin that has not undergone a modification to improve processability of the type described herein. In other words, base resin refers to an LLDPE (e.g., mLLDPE) starting material that is accessed and modified according to the present disclosure. Accordingly, the base resin may include virgin LLDPE resin or reactor "fluff" as recovered from a polymerization process and prior to the addition of any additives or modifiers and/or includes LLDPE resin recovered from a polymerization process that has undergone further processing such as pelletization, which may include the addition of a base additive package of the type commonly added to commercial LLDPE resins (e.g., antioxidants, stabilizer, etc.).

In an aspect, an LLDPE base resin (e.g., mLLDPE) can be treated with a peroxide modifier (e.g., a peroxide modifier can be added to an LLDPE base resin) to yield a peroxide-treated LLDPE (e.g., pmLLDPE). In an aspect, an mLLDPE base resin can be treated with a peroxide modifier (e.g., a peroxide modifier can be added to an mLLDPE base resin) to yield a pmLLDPE.

In an aspect, an mLLDPE base resin suitable for subjecting to peroxide treatment as disclosed herein can be a copolymer of ethylene with from about 0.2 mol % to about 0.5 mol % 1-hexene. In an aspect, an mLLDPE base resin suitable for subjecting to peroxide treatment as disclosed herein may have a density of from about 0.913 g/cc to about 0.918 g/cc, alternatively from about 0.913 g/cc to about 0.915 g/cc, or alternatively from about 0.915 g/cc to about 0.918 g/cc, as determined in accordance with ASTM D1505; a melting point of from about 112° C. to about 120° C., alternatively from about 112° C. to about 115° C., or alternatively from about 115° C. to about 119° C., as determined in accordance with ASTM D3418; a melt index of from about 0.7 g/10 min to about 1.6 g/10 min, alternatively from about 0.7 g/10 min to about 1.1 g/10 min, or alternatively from about 1.1 g/10 min to about 1.6 g/10 min, when tested in accordance with ASTM D1238 under a force of 2.16 kg; and a Vicat softening temperature of from about 100° C. to about 106° C., alternatively from about 100° C. to about 103° C., or alternatively from about 103° C. to about 106° C., as determined in accordance with ASTM D1525.

The mLLDPE base resin suitable for subjecting to peroxide treatment as disclosed herein may be prepared using any suitable methodology for preparation of the polymer. Methods of preparing a mLLDPE are described for example in U.S. Pat. Nos. 6,300,271; 6,831,141; 6,887,819; 7,148,298; and 7,041,617; each of which is incorporated by reference herein in its entirety.

Without limitation, a representative example of an mLLDPE base resin suitable for subjecting to peroxide treatment as disclosed herein includes a metallocene-catalyzed mLLDPE resin that has about the physical properties given in Table 3. Unless otherwise specified herein, the physical properties disclosed herein were determined in accordance with the test methods recited in Table 3.

TABLE 3

|  | English | SI | Method |
|---|---|---|---|
| Nominal Resin Properties | | | |
| Density | — | 0.914 g/cm$^3$ | ASTM D1505 |
| Melt Index, 190° C. /2.16 Kg | — | 0.9 g/10 min | ASTM D1238 |
| Nominal Blown Film Properties at 1.00 mil (25 micron) | | | |
| Haze | 4% | 4% | ASTM D1003 |
| Gloss, 60° | 130 | 130 | ASTM D2457 |
| COF | >1 | >1 | ASTM D1894 |
| Dart Impact (g) | | 800 g/mil | ASTM D1709 |
| Elmendorf Tear MD/TD (g) | | 115/300 g/mil | ASTM D1922 |
| Tensile Strength at Yield MD/TD* | 2000/1200 psig | 14/8 MPag | ASTM D882 |
| Tensile Strength at Break MD/TD | 12000/10000 psig | 83/69 MPag | ASTM D882 |
| Tensile Elongation at Break MD/TS | 450/600% | 450/600% | ASTM D882 |
| 1% Secant Modulus MD/TD | 19000/22000 psig | 131/152 MPag | ASTM D882 |
| Film Puncture Energy | 93 in · lbf | 10.5 J | ASTM D3763 |
| Film Puncture Force | 29.1 in · lbf | 129 N | ASTM D3763 |
| Seal Initiation Temperature | 208° F. | 98.0° C. | ASTM F 88[+] |

*MD = machine direction; TD = transverse direction

[+]Temperature at which 0.3 lb/in heat seal strength is achieved, 0.5 s dwell, 30 psi pressure, 11.8 in · min separation rate In an aspect, the peroxide modifier comprises an organic peroxide. Nonlimiting examples of peroxide modifiers suitable for use in the present disclosure include 2,5-dimethyl-2,5-di(tert-butylperoxy)hexane; 1,1-di(tert-butylperoxy)cyclohexane; 1,1-di(tert-amylperoxy)cyclohexane; 1,1-di-(tert-butylperoxy)-3,3,5-trimethylcyclohexane; tert-butylperoxy 2-ethylhexyl carbonate; di-2-ethylhexyl peroxydicarbonate; tert-amyl peroxypivalate; tert-butyl peroxypivalate; di-(3,5,5-trimethylhexanoyl) peroxide; dilauroylperoxide; didecanoyl peroxide; 1,1,3,3-tetramethyl-butyl-peroxy-2-ethylhexanoate; dibenzoyl peroxide; 2,5-dimethyl-2,5-di(2-ethylhexanoyl peroxy)hexane; tert-amyl peroxy-2-ethylhexanoate; tert-butyl peroxy-2-ethylhexanoate; tert-butyl peroxy isobutyrate; OO-t-amyl-O-(2-ethylhexyl monoperoxy-carbonate); OO-t-butyl O-isopropyl monoperoxy-carbonate; OO-t-butyl-O-(2-ethylhexyl) monoperoxy-carbonate; butyl 4,4-di(t-butylperoxy)valerate; ethyl 3,3-di-(t-butylperoxy)butyrate; and the like; or combinations thereof.

In an aspect, the peroxide modifier can be employed (e.g., added to an mLLDPE base resin of the type described herein) as a powder, as a master batch, in a carrier (e.g., polypropylene, calcium carbonate, etc.), or combinations thereof.

In an aspect, an mLLDPE base resin of the type described herein can be contacted with from about 25 ppm to about 400 ppm of peroxide modifier, alternatively from about 50 ppm to about 350 ppm of peroxide modifier, or alternatively from about 100 ppm to about 300 ppm of peroxide modifier, based on the total weight of the mLLDPE base resin. As will be appreciated by one of skill in the art, and with the help of this disclosure, the peroxide modifier is added to the base resin during a processing step (e.g., extrusion, pellet formation, etc.), and upon finalizing such processing step, the resulting pmLLDPE does not contain any substantial amount of peroxide modifier, as the peroxide modifier is consumed and/or decomposes during the processing step. Without wishing to be limited by theory, the half-life of the peroxide modifier is short enough such that by the end of the processing step wherein the peroxide modifier was employed, no or substantially no peroxide modifier can be found in the resulting pmLLDPE. In an aspect, the pmLLDPE comprises less than about 300 ppm peroxide modifier, alternatively less than about 200 ppm peroxide modifier, alternatively less than about 100 ppm peroxide modifier, alternatively less than about 50 ppm peroxide modifier, alternatively less than about 10 ppm peroxide modifier, alternatively less than about 1 ppm peroxide modifier, alternatively less than about 0.1 ppm peroxide modifier, or alternatively less than about 0.01 ppm peroxide modifier, based on the total weight of the pmLLDPE. In an aspect, the pmLLDPE is substantially free of peroxide modifier.

In an aspect, the peroxide modifier can improve the processability of the peroxide-treated mLLDPE (e.g., pmLLDPE). Without wishing to be limited by theory, the peroxide modifier crosslinks the polymer chains and creates long chain branching, thereby improving melt properties of the mLLDPE while increasing the average molecular weight of the polymer. As will be appreciated by one of skill in the art, and with the help of this disclosure, higher molecular weight polymers could impart desired physical and/or mechanical properties to manufactured articles (e.g., extruded articles, films); however, higher molecular weight polymers are more difficult to process.

In an aspect, the pmLLDPE comprises crosslinks. In such aspect, the crosslinks can be due to the treatment of an mLLDPE base resin of the type described herein with a peroxide modifier to yield the pmLLDPE. In an aspect, the crosslinks can comprise C-C bonds established between polymer strands or chains in any pattern. As will be appreciated by one of skill in the art, and with the help of this disclosure, and without wishing to be limited by theory, the peroxide modifier can initiate radical forming reactions, thereby creating radicals on the polymer strands that enable the formation of C-C bonds between polymer strands. Further, as will be appreciated by one of skill in the art, and with the help of this disclosure, any single polymer strand can be crosslinked to more than one other polymer strand.

In an aspect, a pmLLDPE suitable for use in this disclosure may be characterized by a long chain branching (LCB) content of from about $7.5 \times 10^{-3}$ to about $3.00 \times 10^{-2}$ long chain branches per 1,000 carbon atoms, alternatively from about $1.00 \times 10^{-2}$ to about $2.75 \times 10^{-2}$ long chain branches per 1,000 carbon atoms, or alternatively from about $1.50 \times 10^{-2}$ to about $2.60 \times 10^{-2}$ long chain branches per 1,000 carbon atoms. As will be appreciated by one of skill in the art, and with the help of this disclosure, and without wishing to be limited by theory, an increased LCB content correlates with improved processability of polymers. Increased LCB content correlates with improved melt strength translating to improved edge stability in the process of extrusion coating. Furthermore, additional LCB content over any PE formulation wherein density and melt index is held constant will provide a desirable reduction in neck-in, providing for a PE formulation with a greater useable product width.

In an aspect, a pmLLDPE suitable for use in this disclosure may be characterized by a short chain branching (SCB) content of from about 10.0 to about 20.0 short chain branches per 1,000 carbon atoms, alternatively from about 12.5 to about 17.5 short chain branches per 1,000 carbon atoms, or alternatively from about 14.0 to about 15.0 short chain branches per 1,000 carbon atoms.

In an aspect, a pmLLDPE suitable for use in this disclosure may be characterized by an LCB to SCB ratio of from about $5.13 \times 10^{-4}$ to about $2.37 \times 10^{-3}$, alternatively from about $9.18 \times 10^{-4}$ to about $1.97 \times 10^{-3}$, or alternatively from about $1.32 \times 10^{-3}$ to about $1.56 \times 10^{-3}$.

In an aspect, a pmLLDPE suitable for use in this disclosure may be characterized by an $\eta_0$ (eta_0) of from about $1.50 \times 10^5$ Pa-s to about $3.50 \times 10^5$ Pa-s, alternatively from about $2.00 \times 10^5$ Pa-s to about $3.00 \times 10^5$ Pa-s, or alternatively from about $2.25 \times 10^5$ Pa-s to about $2.75 \times 10^5$ Pa-s. The zero shear viscosity ($\eta_0$) or eta_0 refers to the viscosity of the polymer (e.g., pmLLDPE) at a zero shear rate and is indicative of the molecular structure of materials. Further, for polymer melts, the zero shear viscosity is often a useful indicator of processing attributes such as melt strength in blow-molding and foam technologies and bubble stability in film blowing. For example, the higher the zero shear viscosity, the better the melt strength or bubble stability.

In an aspect, a pmLLDPE suitable for use in this disclosure may be characterized by an $\eta_{100}$ (eta_100) of from about $1.77 \times 10^3$ Pa-s to about $3.60 \times 10^3$ Pa-s, alternatively from about $2.02 \times 10^3$ Pa-s to about $3.35 \times 10^3$ Pa-s, or alternatively from about $2.26 \times 10^3$ Pa-s to about $3.10 \times 10^3$ Pa-s. As will be appreciated by one of skill in the art, and with the help of this disclosure, improvements in processing (e.g., improved processability) can include a decrease in head pressure during an extrusion process. The viscosity at 100 rad/s can be a useful indicator that correlates with the extrusion pressure in polymer processes: the lower the $\eta_{100}$, the lower the head pressure, the more improved the processability.

In an aspect, a pmLLDPE suitable for use in this disclosure may have a density of from about 0.909 g/cc to about 0.919 g/cc, alternatively from about 0.910 g/cc to about 0.918 g/cc, or alternatively from about 0.912 g/cc to about 0.916 g/cc, as determined in accordance with ASTM D1505; a melting point of from about 105° C. to about 140° C., alternatively from about 110° C. to about 130° C., or alternatively from about 115° C. to about 125° C., as determined in accordance with ASTM D3418; a melt index of from about 0.1 g/10 min to less than about 1 g/10 min, alternatively from about 0.15 g/10 min to about 0.9 g/10 min, or alternatively from about 0.2 g/10 min to about 0.5 g/10 min, when tested in accordance with ASTM D1238 under a force of 2.16 kg; and a Vicat softening temperature of from about 85° C. to about 115° C., alternatively from about 90° C. to about 110° C., or alternatively from about 95° C. to about 105° C., as determined in accordance with ASTM D1525.

In an aspect, a pmLLDPE suitable for use in this disclosure may have a melt index of less than about 1 g/10 min, alternatively equal to or less than about 0.9 g/10 min, alternatively equal to or less than about 0.8 g/10 min, alternatively equal to or less than about 0.7 g/10 min, alternatively equal to or less than about 0.6 g/10 min, or alternatively equal to or less than about 0.5 g/10 min, when tested in accordance with ASTM D1238 under a force of 2.16 kg. In some aspects, a pmLLDPE suitable for use in this disclosure may have a melt index of about 0.33 g/10 min, when tested in accordance with ASTM D1238 under a force of 2.16 kg.

Without limitation, a representative example of a pmLLDPE suitable for use in the present disclosure includes a peroxide-treated mLLDPE resin (e.g., a resin having about the physical properties given in Table 3 that has been subjected to peroxide treatment). A pmLLDPE suitable for use in the present disclosure has about the physical properties given in Table 4. Unless otherwise specified herein, the physical properties disclosed herein were determined in accordance with the test methods recited in Table 4.

agents, oxidants, anti-oxidants, ultraviolet light absorbents, fire retardants, processing oils, coloring agents, pigments/dyes, fillers, and/or the like with other components. The aforementioned additives may be used either singularly or in combination to form various formulations of the polymer. Any suitable methodology may be employed to include effective amounts of these additives into the LDPE, pmLLDPE, PEB, or combinations thereof In some aspects, the LDPE, pmLLDPE, PEB, or combinations thereof exclude additives of the type disclosed herein.

In an aspect, a PEB as disclosed herein may be prepared by combining an LDPE, a pmLLDPE, and optionally additives; each of the type described herein, using an extruder in a process known as extrusion compounding. Extrusion compounding refers to the process of mixing the polymers and optional additives to produce desired blends. The mixing may be carried out within a single screw extruder utilized in the extrusion coating process. Alternately, this mixing may be completed using a continuous mixer such as for example a mixer consisting of a short non-intermeshing counter rotating twin screw extruder for mixing/melting the components of the PEB and a single screw extruder or a gear pump for pumping. In an aspect, the PEB may be prepared by combining an LDPE, a pmLLDPE, and optionally additives by dry blending the polymers.

In an aspect, the LDPE and pmLLDPE used in the formation of the PEB have a ΔMI of from about 4.5 to about 25, alternatively of from about 5 to about 20, alternatively from about 10 to about 17, alternatively equal to or greater than about 10, alternatively equal to or greater than about 13, or alternatively equal to or greater than about 16. Herein the ΔMI refers to the absolute value of the difference between the MI of the LDPE and the MI of the pmLLDPE. In an aspect, the LDPE and pmLLDPE having a ΔMI within the disclosed ranges may form a compatible polymer blend suitable for use in applications such as extrusion coating. Herein a compatible polymer blend refers to the ability of the polymers in the blend to commingle and form a composition lacking significant deviations in rheology or appear-

TABLE 4

| NOMINAL PHYSICAL PROPERTIES[1] | English | SI | Method |
|---|---|---|---|
| Density | — | 0.914 g/cm$^3$ | ASTM D1505 |
| Flow Rate (MI, 190° C./2.16 kg) | — | 0.30 g/10 min | ASTM D1238 |
| Tensile Strength at Yield, 2 in/min, Type IV bar | 1,400 psi | 9.6 MPa | ASTM D638 |
| Elongation at Break, 2 in/min, Type IV bar | 580% | 580% | ASTM D638 |
| Elongation at Break, 2 in/min, Type IV bar | 900% | 900% | ASTM D6693 |
| ESCR, Condition B (10% Igepal), F50 | >10,000 h | >10,000 h | ASTM D1693 |
| ESCR, Condition C (100% Igepal), F50 | >10,000 h | >10,000 h | ASTM D1693 |
| SP-NCTL | >10,000 h | >10,000 h | ASTM D5397 (Appendix X1) |
| Brittleness Temperature, Type A, Type I specimen | <−103° F. | <−75° C. | ASTM D746 |
| Oxidative Induction Time, 200° C. | >100 min | >100 min | ASTM D3895 |

[1]The nominal properties reported herein are typical of the product, but do not reflect normal testing variance. Values are rounded. The physical properties were determined on compression molded specimens that were prepared in accordance with Procedure C of ASTM D4703, Annex A1.

In an aspect, the pmLLDPE suitable for use in the present disclosure is present in the PEB in an amount of from about 1 wt. % to about 80 wt. %, alternatively from about 10 wt. % to about 70 wt. %, or alternatively from about 20 wt. % to about 50 wt. %, based on the total weight of the PEB.

In an aspect, the LDPE, pmLLDPE, PEB, or combinations thereof may also contain additives as deemed necessary to impart desired physical properties. Examples of additives include without limitation stabilizers, antiblocking agents, slip additives, antistatic agents, ultra-violet screening ance from the individual constituents of the composition. The compatibility of the polymer blend may be determined by visual observation of the blended composition to note inhomogeneities in the blend such as the presence or absence of portions of the blend having distinctly different rheological features and/or appearance from other portions of the blend. The compatibility of the polymers may be rated on a scale of 1 to 4 wherein polymers that blend to form a compatible polymer blend having homogenous features may be given a compatibility rating in the range of 1 to 2 while polymers that blend to form poorly compatible to incompatible compositions may be given a compatibility rating in the range of 3 to 4. In an aspect, a PEB of the type disclosed herein having a ΔMI within the disclosed ranges form polymer blends having a compatibility rating of 1.

In an aspect, the PEB as disclosed herein may be used in extrusion coating applications. Extrusion coating is the coating of a molten resin onto a substrate, i.e., paper, paperboard, aluminum foil, cellulose, nonwovens, plastic film, and the like, or combinations thereof The process of extrusion coating involves extruding molten resin (e.g., PEB) from a slot die at temperatures of up to 340° C. directly onto a moving web. The resin extruding from the slot die forms a curtain of molten resin (i.e., a polymer curtain) which is applied to the substrate. The slot die may have an operational width x that is the width along which molten resin may flow and form a polymer curtain having width x that is applied to the substrate. However, molten polymer extruding through the slot die may tend to exhibit some degree of shrinkage such that the polymer curtain does not maintain the width at which it was extruded from the slot die. This phenomenon known as "neck-in" results in a tapering of the width of the polymer curtain that is applied to the substrate to a width designated y where y is less than x. Further, as result of neck-in, an uneven amount of coating is applied onto the substrate where the amount of coating present on the outer edges of the substrate is greater than the amount of coating present on the interior portion of the substrate. The outer edges may be removed and discarded so as to recover that portion of substrate having an even thickness of coating. The material that is removed is termed "trim waste."

In some aspects, a PEB of the type disclosed herein comprising an LDPE and a pmLLDPE displays an amount of neck-in value that is decreased when compared to the neck-in value observed when using the LDPE alone. For example, the PEB of the type disclosed herein comprising an LDPE and a pmLLDPE displays an amount of neck-in value that is decreased by equal to or greater than about 10%, alternatively by equal to or greater than about 25%, alternatively by equal to or greater than about 30%, alternatively by equal to or greater than about 35%, alternatively by equal to or greater than about 40%, alternatively by equal to or greater than about 45%, alternatively by equal to or greater than about 50%, or alternatively by equal to or greater than about 55% of the neck-in value observed when using the LDPE alone.

In other aspects, a PEB of the type disclosed herein comprising an LDPE and a pmLLDPE displays an amount of neck-in value that is about equal to the neck-in value observed when using the LDPE alone.

In yet other aspects, a PEB of the type disclosed herein comprising an LDPE and a pmLLDPE displays an amount of neck-in value that is increased by less than about 10%, alternatively less than about 7.5%, or alternatively less than about 5% of the neck-in value observed when using the LDPE alone.

For example, a polymer extruding from the slot die has width y when it contacts the substrate. The neck-in value δ is the difference between the width of the slot die (x) and the width of the polymer curtain when it contacts the substrate (y) such that δ=x−y. If the neck-in value of the LDPE is designated $\delta_0$ then a PEB of this disclosure may have a neck-in value that is: (i) less than about $\delta_0$, (ii) about equal to $\delta_0$, or (iii) from greater than about $\delta_0$ to about 10% greater than $\delta_0$. This may result in a reduction in trim waste such that extrusion coating a substrate with a PEB of the type disclosed herein produces an amount of trim waste that is (i) decreased when compared to the amount of trim waste produced when using the LDPE alone, (ii) about equal to the amount of trim waste produced when using the LDPE alone, or (iii) increased by less than about 10%, alternatively less than about 7.5%, or alternatively less than about 5% of the amount of trim waste produced when using the LDPE alone. It is to be understood that "using the LDPE alone" refers to preparing an extrusion coating comprising only the LDPE used in the PEB. Thus, all comparisons made with regard to "using the LDPE alone" are meant to compare the properties exhibited by the PEB comprising an LDPE and a pmLLDPE to the properties exhibited by the LDPE used in the PEB singularly.

In an aspect, a PEB of the type disclosed herein comprising an LDPE and a pmLLDPE displays an amount of neck-in value that is decreased by equal to or greater than about 5%, alternatively equal to or greater than about 10%, or alternatively equal to or greater than about 15% when compared with a neck-in value of an otherwise similar composition comprising the LDPE and a metallocene-catalyzed linear low density polyethylene (mLLDPE) that has not been peroxide-treated (e.g., mLLDPE base resin). It is to be understood that all comparisons made with regard to "an otherwise similar composition comprising the LDPE and an mLLDPE that has not been peroxide-treated" refers to preparing an extrusion coating comprising the LDPE and the mLLDPE base resin. Thus, all comparisons made with regard to "an otherwise similar composition comprising the LDPE and an mLLDPE that has not been peroxide-treated" are meant to compare the properties exhibited by the PEB comprising an LDPE and a pmLLDPE to the properties exhibited by a polymer blend comprising the LDPE and the mLLDPE base resin.

In an aspect, a PEB of the type disclosed herein comprising an LDPE and a pmLLDPE when extruded on an extruder as a molten resin provides for an extrusion pressure that is decreased by equal to or greater than about 2%, alternatively by equal to or greater than about 5%, alternatively by equal to or greater than about 10%, or alternatively by equal to or greater than about 12.5% when compared with an extrusion pressure provided on the same extruder by an otherwise similar composition comprising the LDPE and an mLLDPE that has not been peroxide-treated (e.g., mLLDPE base resin). The extruder pressure is the melt pressure which is measured with a pressure transducer before the breaker plate in psi values.

In an aspect, a PEB of the type disclosed herein comprising an LDPE and a pmLLDPE when extruded on an extruder as a molten resin provides for a motor load that is decreased by equal to or greater than about 4%, alternatively by equal to or greater than about 7.5%, alternatively by equal to or greater than about 10%, alternatively by equal to or greater than about 12.5%, or alternatively by equal to or greater than about 15% when compared with a motor load provided on the same extruder by an otherwise similar composition comprising the LDPE and an mLLDPE that has not been peroxide-treated (e.g., mLLDPE base resin). The motor load is measured in amps, and is the amount of energy from the motor introduced into the polymer to maintain a consistent melt temperature.

In an aspect, the PEB comprising an LDPE and a pmLLDPE as disclosed herein may be used to coat any suitable substrate. Nonlimiting examples of substrates suitable for coating with the PEB as disclosed herein include paperboard, paper, films, foils, nonwovens, wovens, and the like, or combinations thereof The PEB as disclosed herein may be utilized to provide an extrusion coating having a thickness of from about 0.25 mil to about 4.0 mil, alternatively from about 0.40 mil to about 4.0 mil, alternatively from about 0.60 mil to about 4.0 mil, alternatively from about 0.60 mil to about 2.0 mil, or alternatively from about 2.0 mil to about 4.0 mil. A "mil" is a measurement that equals one-thousandth of an inch, or 0.001 inch, or 25.4 micrometers.

Examples of markets for extrusion coating include without limitation a variety of end-use applications such as liquid packaging, photographic, flexible packaging, and other commercial applications. In an aspect, the PEB is used to form an extrusion coating that is used to seal or close a package. Heat sealing is the major technique used for forming and closing flexible packages. Heat is used to rapidly activate a sealant layer comprised of a heat sealable material, usually a polymeric resin (e.g., PEB). The temperature required to activate the heat sealable material and form a durable seal is termed the "seal initiation temperature" (SIT) and the ability of the seal to resist opening immediately after being formed is termed "hot tack." The temperature range over which a durable seal can be formed and maintained is termed the "hot tack window."

Coatings formed from the PEBs of this disclosure may display improved thermal properties such as an increased heat seal strength. In an aspect, the coatings formed from a PEB of the type disclosed herein have a SIT of from about 90° C. to about 100° C., alternatively from about 90° C. to about 99° C., or alternatively from about 95° C. to about 99° C.; and a hot tack window of from about 100° C. to about 105° C., alternatively from about 101° C. to about 104° C., or alternatively from about 102° C. to about 104° C. The SIT and hot tack window may be determined using a heat seal tester in accordance with ASTM F 1921-98 method A.

In an aspect, the PEB comprising an LDPE and a pmLLDPE as disclosed herein may display improved processability when compared to the pmLLDPE alone.

In an aspect, an extrusion coating formed from a PEB of the type disclosed herein may display an improved abuse resistance. Herein abuse resistance refers to the ability of the coating to resist deformation when exposed to one or more forces. For example, an extrusion coating of the type disclosed herein may form a coating that exhibits increases in properties such as tear resistance, dart drop impact strength, and/or Elmendorf tear strength when compared to the properties of a polymer blend component by itself Herein the tear resistance refers to the force required to tear a film or sheet as determined in accordance with ASTM D 1004. Herein the dart drop impact strength refers to the weight required to cause 50% of the tested sample to fail by impact from a falling dart under specified conditions as determined in accordance with ASTM D 1709. Herein the Elmendorf tear strength refers to the average force required to propagate tearing through a specified length of plastic film or nonrigid sheeting on an Elmendorf-type tear tester as determined in accordance with ISO 6383-2.

In an aspect, a PEB as disclosed herein may comprise LDPE and pmLLDPE, wherein the LDPE may have about the physical properties given in Table 1, and wherein the pmLLDPE may have about the physical properties given in Table 4. For example, such PEB may comprise from about 20 wt. % to about 99 wt. %, alternatively from about 30 wt. % to about 90 wt. %, or alternatively from about 50 wt. % to about 80 wt. % LDPE having about the physical properties given in Table 1, based on the total weight of the PEB; and from about 1 wt. % to about 80 wt. %, alternatively from about 10 wt. % to about 70 wt. %, or alternatively from about 20 wt. % to about 50 wt. % pmLLDPE having about the physical properties given in Table 4, based on the total weight of the PEB. In such aspect, the PEB when extruded as a molten resin displays a neck-in value that is decreased by equal to or greater than about 40%, alternatively equal to or greater than about 45%, alternatively equal to or greater than about 50%, or alternatively equal to or greater than about 55% of the neck-in value observed when using LDPE having about the physical properties given in Table 1 alone. In such aspect, the PEB when extruded on an extruder as a molten resin provides for a motor load that is decreased by equal to or greater than about 7.5%, alternatively by equal to or greater than about 10%, alternatively by equal to or greater than about 12.5%, or alternatively by equal to or greater than about 15% when compared with a motor load provided on the same extruder by an otherwise similar composition comprising LDPE having about the physical properties given in Table 1 and mLLDPE having about the physical properties given in Table 3 that has not been peroxide-treated (e.g., mLLDPE base resin).

In an aspect, a PEB as disclosed herein may comprise LDPE and pmLLDPE, wherein the LDPE may be LDPE having about the physical properties given in Table 2, and wherein the pmLLDPE may be pmLLDPE having about the physical properties given in Table 4. For example, such PEB may comprise from about 20 wt. % to about 99 wt. %, alternatively from about 30 wt. % to about 90 wt. %, or alternatively from about 50 wt. % to about 80 wt. % LDPE having about the physical properties given in Table 2, based on the total weight of the PEB; and from about 1 wt. % to about 80 wt. %, alternatively from about 10 wt. % to about 70 wt. %, or alternatively from about 20 wt. % to about 50 wt. % pmLLDPE having about the physical properties given in Table 4, based on the total weight of the PEB. In such aspect, the PEB when extruded as a molten resin displays a neck-in value that is about equal to or increased by less than about 10%, alternatively less than about 7.5%, or alternatively less than about 5% of the neck-in value observed when using the LDPE having about the physical properties given in Table 2 alone. In such aspect, the PEB when extruded on an extruder as a molten resin provides for a motor load that is decreased by equal to or greater than about 12.5%, alternatively by equal to or greater than about 15%, or alternatively by equal to or greater than about 15% when compared with a motor load provided on the same extruder by an otherwise similar composition comprising LDPE having about the physical properties given in Table 2 and mLLDPE having about the physical properties given in Table 3 that has not been peroxide-treated (e.g., mLLDPE base resin). In such aspect, the PEB when extruded on an extruder as a molten resin provides for an extrusion pressure that is decreased by equal to or greater than about 10%, alternatively by equal to or greater than about 12.5%, or alternatively by equal to or greater than about 15% when compared with an extrusion pressure provided on the same extruder by an otherwise similar composition comprising LDPE having about the physical properties given in Table 2 and mLLDPE having about the physical properties given in Table 3 that has not been peroxide-treated (e.g., mLLDPE base resin).

In an aspect, the PEB comprising LDPE and pmLLDPE as disclosed herein can advantageously display improved characteristics when compared to conventional polymers (e.g., LDPE) and/or conventional polymer blends (e.g., a blend of LDPE and mLLDPE base resin). The PEB comprising LDPE and pmLLDPE as disclosed herein can advantageously out-perform conventional polymers (e.g., LDPE)

and/or conventional polymer blends (e.g., a blend of LDPE and mLLDPE base resin) regarding neck-in, extrusion pressure, and motor load.

In some aspects, the PEB comprising LDPE and pmLLDPE as disclosed herein can advantageously display a neck-in reduction of equal to or greater than about 55%, when compared to the neck-in value observed when using LDPE alone. Reducing neck-in may advantageously result in less trim waste, and allow for greater coating width beyond the coating width that can be achieved with conventional polymers (e.g., LDPE) and/or conventional polymer blends (e.g., a blend of LDPE and mLLDPE base resin).

In some aspects, the PEB comprising LDPE and pmLLDPE as disclosed herein can advantageously display reduced pin hole formation when compared to conventional polymers (e.g., LDPE) and/or conventional polymer blends (e.g., a blend of LDPE and mLLDPE base resin).

In some aspects, the PEB comprising LDPE and pmLLDPE as disclosed herein can advantageously display increased seal strength when compared to conventional polymers (e.g., LDPE) and/or conventional polymer blends (e.g., a blend of LDPE and mLLDPE base resin). Additional advantages of the polymer blends comprising LDPE and pmLLDPE as disclosed herein can be apparent to one of skill in the art viewing this disclosure.

The present disclosure is further illustrated by the following examples, which are not to be construed in any way as imposing limitations upon the scope thereof On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

EXAMPLES

The disclosure having been generally described, the following examples demonstrate the practice and advantages thereof It is understood that the examples are given by way of illustration and are not intended to limit the specification of the claims to follow in any manner.

Example 1

Different polymer blend samples were prepared by blending an LDPE (LDPE having about the physical properties given in Table 2 or LDPE having about the physical properties given in Table 1) in different amounts with an LLDPE: either mLLDPE having about the physical properties given in Table 3 (for comparison purposes) or pmLLDPE having about the physical properties given in Table 4 (pmLLDPE), in the proportions indicated in Tables 5-7.

TABLE 5

| 14.5 lb/ream | | | | | |
|---|---|---|---|---|---|
| Structure on #40 Natural Craft | Temp | AMPS | Pressure | Neck-in (in./side) | Comments |
| LDPE of Table 1 | 600 | 34 | 1190 | 4 | no gels |
| LDPE of Table 1 + 20% pmLLDPE of Table 4 | 615 | 50 | 2350 | 1.81 | Low Gels |
| LDPE of Table 1 + 20% mLLDPE of Table 3 | 606 | 50 | 2120 | 3.56 | low gels |
| LDPE of Table 1 + 30% pmLLDPE of Table 4 | 613 | 56 | 2950 | 3 | Low Gels |
| LDPE of Table 1 + 30% mLLDPE of Table 3 | 619 | 62 | 2830 | 3.75 | low gels |
| LDPE of Table 2 | 610 | 46 | 1915 | 3.313 | no gels |
| LDPE of Table 2 + 5% pmLLDPE of Table 4 | 612 | 45 | 2020 | 3.5 | no gels, minor signs of interfacial instability |
| LDPE of Table 2 + 5% mLLDPE of Table 3 | 613 | 47 | 2070 | 3.56 | no gels, minor signs of interfacial instability |
| LDPE of Table 2 + 10% pmLLDPE of Table 4 | 612 | 50 | 2250 | 3.5 | no gels, minor signs of interfacial instability |
| LDPE of Table 2 + 10% mLLDPE of Table 3 | 605 | 60 | 2780 | 3.75 | no gels, minor signs of interfacial instability |
| LDPE of Table 2 + 20% pmLLDPE of Table 4 | 622 | 60 | 2700 | 3.56 | no gels, minor signs of interfacial instability |

TABLE 6

7.25 lb/ream

| Structure on #40 Natural Craft | Temp | AMPS | Pressure | Neck-in (in./side) | Comments |
|---|---|---|---|---|---|
| LDPE of Table 1 | 600 | 34 | 1190 | 4.82 | no gels |
| LDPE of Table 1 + 20% pmLLDPE of Table 4 | 615 | 50 | 2350 | 2 | Low Gels |
| LDPE of Table 1 + 20% mLLDPE of Table 3 | 606 | 50 | 2120 | 3.56 | low gels |
| LDPE of Table 1 + 30% pmLLDPE of Table 4 | 613 | 56 | 2950 | 3 | Low Gels |
| LDPE of Table 1 + 30% mLLDPE of Table 3 | 619 | 62 | 2830 | 3.31 | low gels |
| LDPE of Table 2 | 610 | 46 | 1915 | 3.5 | no gels |
| LDPE of Table 2 + 5% pmLLDPE of Table 4 | 612 | 45 | 2020 | 3.56 | no gels, minor signs of interfacial instability |
| LDPE of Table 2 + 5% mLLDPE of Table 3 | 613 | 47 | 2070 | 3.56 | no gels, minor signs of interfacial instability |
| LDPE of Table 2 + 10% pmLLDPE of Table 4 | 612 | 50 | 2250 | 3.56 | no gels, minor signs of interfacial instability |
| LDPE of Table 2 + 10% mLLDPE of Table 3 | 605 | 60 | 2780 | 3.813 | no gels, minor signs of interfacial instability |
| LDPE of Table 2 + 20% pmLLDPE of Table 4 | 622 | 60 | 2700 | 3.56 | no gels, minor signs of interfacial instability |

TABLE 7

| Structure on #40 Natural Craft | 14.5 lb/ream | | 7.25 lb/ream | |
|---|---|---|---|---|
| | Neck-in (in./side) | % neck reduction | Neck-in (in./side) | % neck reduction |
| LDPE of Table 1 | 4 | — | 4.82 | — |
| LDPE of Table 1 + 20% pmLLDPE of Table 4 | 1.81 | 55% | 2 | 59% |
| LDPE of Table 1 + 20% mLLDPE of Table 3 | 3.56 | 11% | 3.56 | 26% |
| LDPE of Table 1 + 30% pmLLDPE of Table 4 | 3 | 25% | 3 | 38% |
| LDPE of Table 1 + 30% mLLDPE of Table 3 | 3.75 | 6% | 3.31 | 31% |
| LDPE of Table 2 | 3.313 | — | 3.5 | — |
| LDPE of Table 2 + 5% pmLLDPE of Table 4 | 3.5 | -6% | 3.56 | -2% |
| LDPE of Table 2 + 5% mLLDPE of Table 3 | 3.56 | -7% | 3.56 | -2% |
| LDPE of Table 2 + 10% pmLLDPE of Table 4 | 3.5 | -6% | 3.56 | -2% |
| LDPE of Table 2 + 10% mLLDPE of Table 3 | 3.75 | -13% | 3.813 | -9% |
| LDPE of Table 2 + 20% pmLLDPE of Table 4 | 3.56 | -7% | 3.56 | -2% |

Figure 1B:
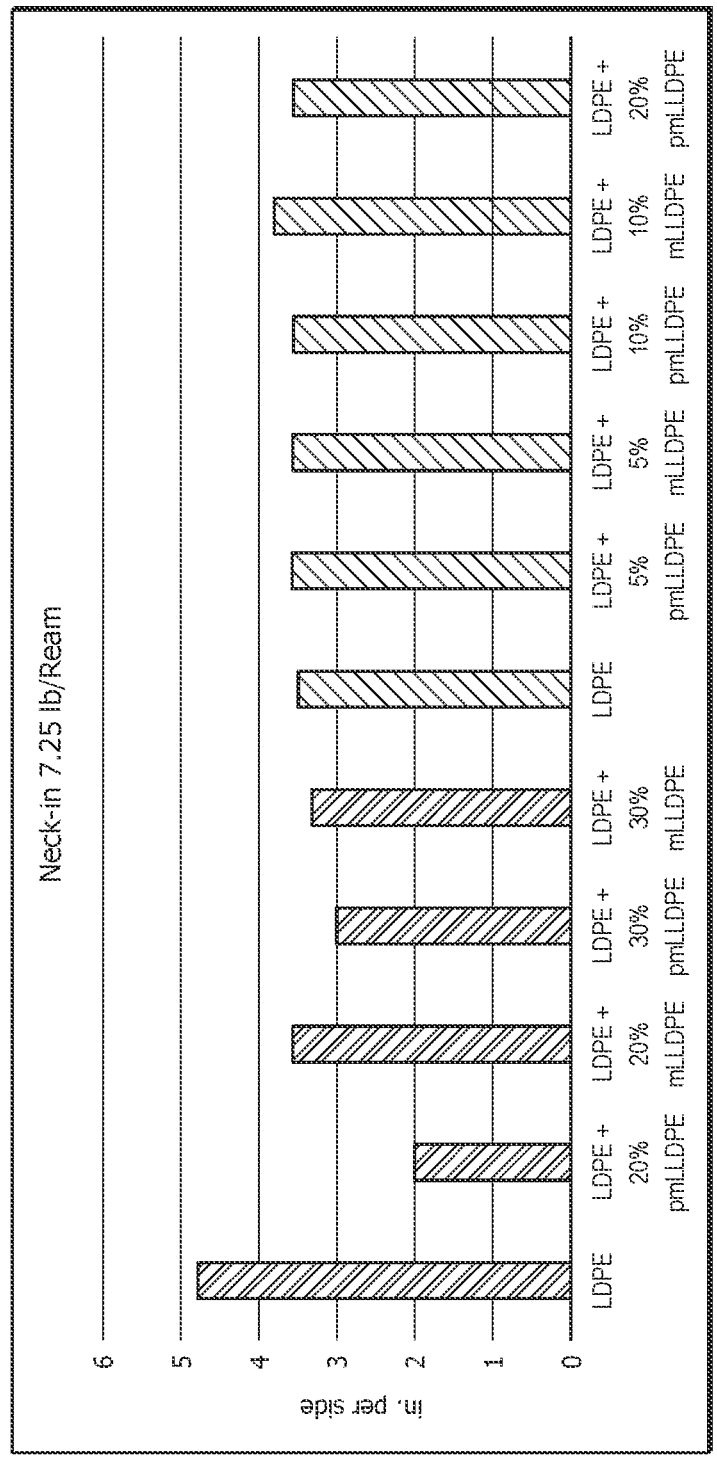
FIG. 1B is a plot of neck-in values for different polyethylene blends at a coating thickness of 0.5 mil.
Figure 2:
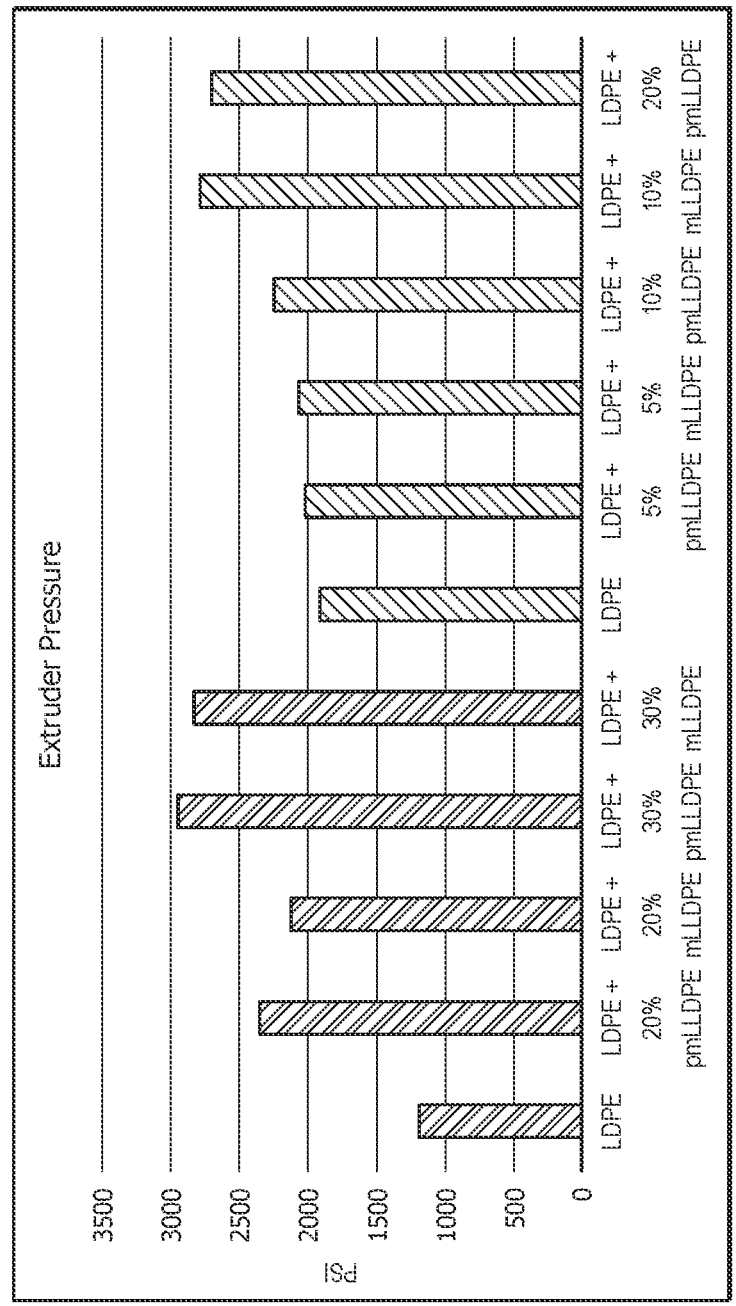
FIG. 2 is a plot of extrusion pressure values for different polyethylene blends.
Figure 3:
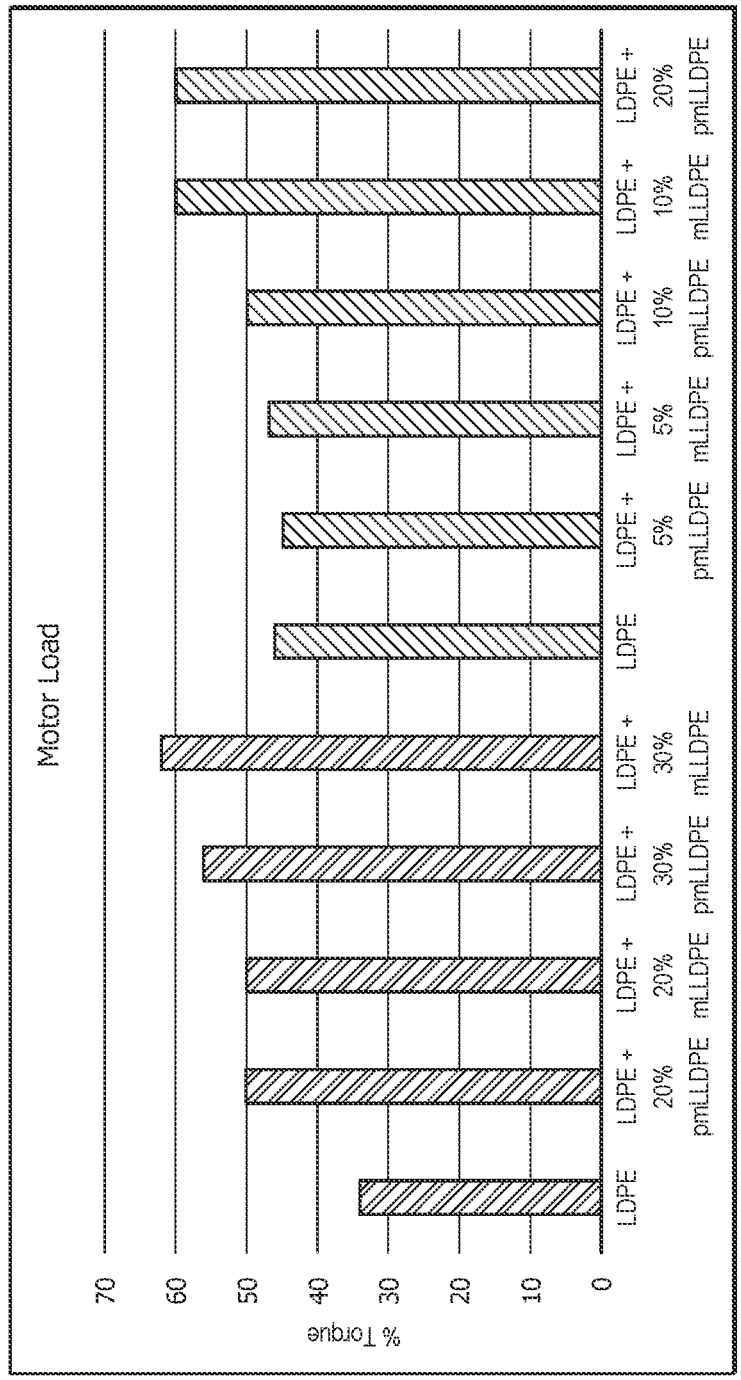
FIG. 3 is a plot of motor load as % torque values for different polyethylene blends.

The polymer blend samples were then extruded in a monolayer configuration using a 5 A selector plug onto a #40 natural kraft substate. The melt was finished on a mirror pocket chill roll, and thereafter the width was measured in inches and compared to the die exit width to determine the neck-in per side. Neck-in results in a narrowing of the final width of the extrudate from the die exit width. The melt pressure is measured with a pressure transducer before the breaker plate in psi values. The motor load is measured in amps, and is the amount of energy from the motor introduced into the polymer to maintain a consistent melt temperature. To determine the quality of the extrudate prior to applying it to the #40 natural kraft substate, the melt was extruded at full run speed into a melt pan while being visually observed for 5 minutes to note any gels, interfacial instability or other more concerning stability issues that may result as unforeseen rheological incompatibility. The polymer blend samples were extruded at 14.5 lbs/ream (equivalent to a coating thickness of 1 mil) or 7.25 lbs/ream (equivalent to a coating thickness of 0.5 mil). A plot of the neck-in as a function of sample is presented in FIG. 1A for the 1 mil thick coating and in FIG. 1B for the 0.5 mil thick coating. The extrusion pressure as a function of sample is shown in FIG. 2, while the motor load expressed as % torque as a function of sample is shown in FIG. 3.

The results in Tables 5-7 demonstrate surprisingly and unexpectedly that the neck-in value decreases by equal to or greater than about 55% in a PEB as disclosed herein comprising LDPE with about 20 wt. % pmLLDPE. Further, the results in Tables 5-7 demonstrate surprisingly and unexpectedly that pmLLDPE having a melt index of 0.33 g/10 min (as determined in accordance with ASTM D1238 under a force of 2.16 kg) blended with each of the LDPE having about the physical properties given in Table 2 (MI of 5.1 g/10 min) and LDPE having about the physical properties given in Table 1 (MI of 16 g/10 min) without concerning gel or miscibility issues that would've been expected when blending polymers having large differences in their melt index values. Furthermore, it was surprising and unexpected to achieve less neck-in, motor load and extrusion pressure when using pmLLDPE blends by comparison to mLLDPE blends.

Example 2

Figure 4:
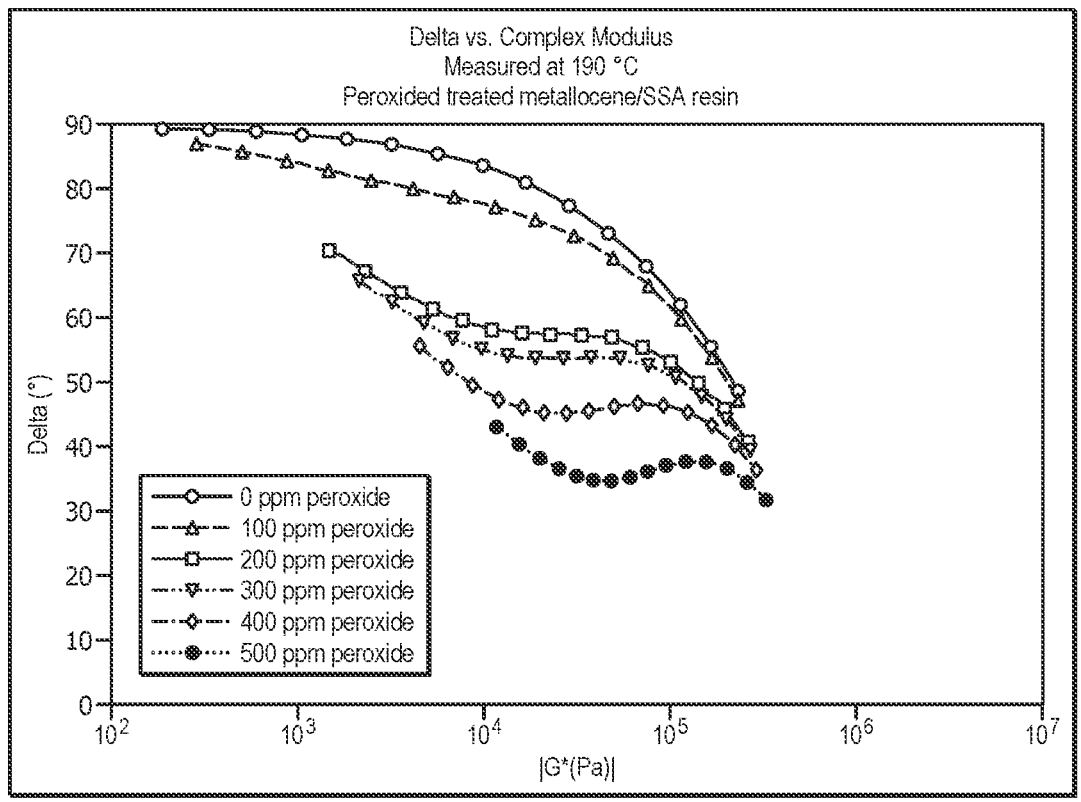
FIG. 4 displays a van Gurp-Palmen plot for different levels of peroxide treatment of a polymer.

A polymer sample was treated with different levels of peroxide to yield a peroxide-treated polymer, and the rheology of the polymer and peroxide-treated polymer was investigated by using a dynamic small amplitude parallel plate oscillation. A van Gurp-Palmen (vGP) plot was generated from the rheology data, as shown in FIG. 4, which displays the variation of the phase angle (Delta) vs the absolute values of the complex shear modulus (|G*|). For the data displayed in FIG. 4, a 0.914 g/cc density, 0.9 g/10 min melt index, metallocene linear low PE (mLLDPE) was treated at 100 ppm intervals up to 500 ppm of peroxide via a calcium carbonate carrier. The pmLLDPE used in this extrusion experiment used 500 ppm of a 45 wt. % peroxide on a calcium carbonate carrier. The resulting LCB and polymer cross linkage that occurred as a result of this peroxide addition lowered the melt index to 0.33 g/10 min, implying that the average molecular weight had increased.

The data in FIG. 4 indicate that with increasing the level of peroxide used in the peroxide treatment, the architecture of the polymer is modified in such a manner that from 200 ppm to 500 ppm peroxide treatment level, the plot exhibits a third degree polynomial shape, a plot shape which is not exhibited by untreated polymer. Further, and without wishing to be limited by theory, with increasing the amount of peroxide used for treatment, the phase angle value corresponding to the lowest absolute value of the complex shear modulus also decreases, indicating a corresponding increase in the level of LCB. Furthermore, and without wishing to be limited by theory, the third degree polynomial shape of the plot along with a the decrease in the phase angle value corresponding to the lowest absolute value of the complex shear modulus indicate an increased LCB content as well as an increased level of crosslinking in the peroxide-treated polymer. This shift in phase angle represents a resistance to deformation as the polymer is strained due to the interaction of LCB and higher molecular weight chains being entangled to a point where maximum strain is reached, and these polymer chains may no longer move freely across another to strain further, also commonly referred to as strain hardening.

The fact that this peroxide treatment imparted additional LCB and higher molecular weight chains unexpectedly enables the use in extrusion coating despite an uncommonly low melt index for extrusion coating.

Example 3

Figure 5A:
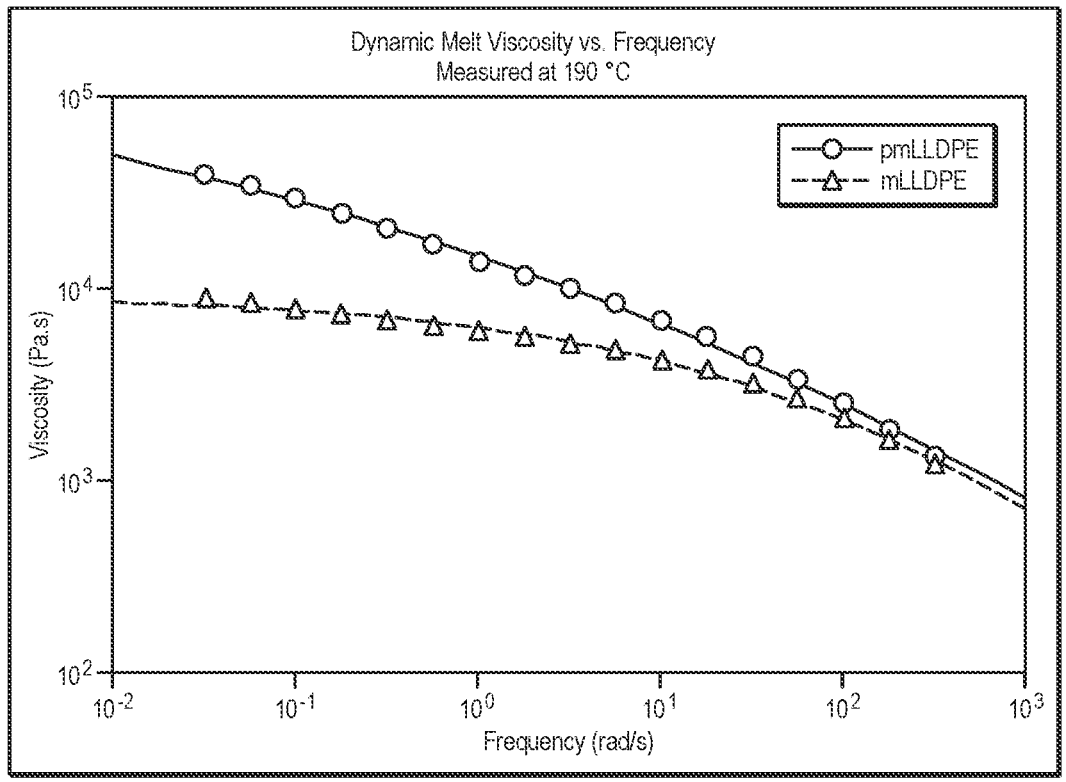
FIGS. 5A-5C display comparison between properties of metallocene-catalyzed linear low density polyethylene with and without peroxide treatment.
Figure 5B:
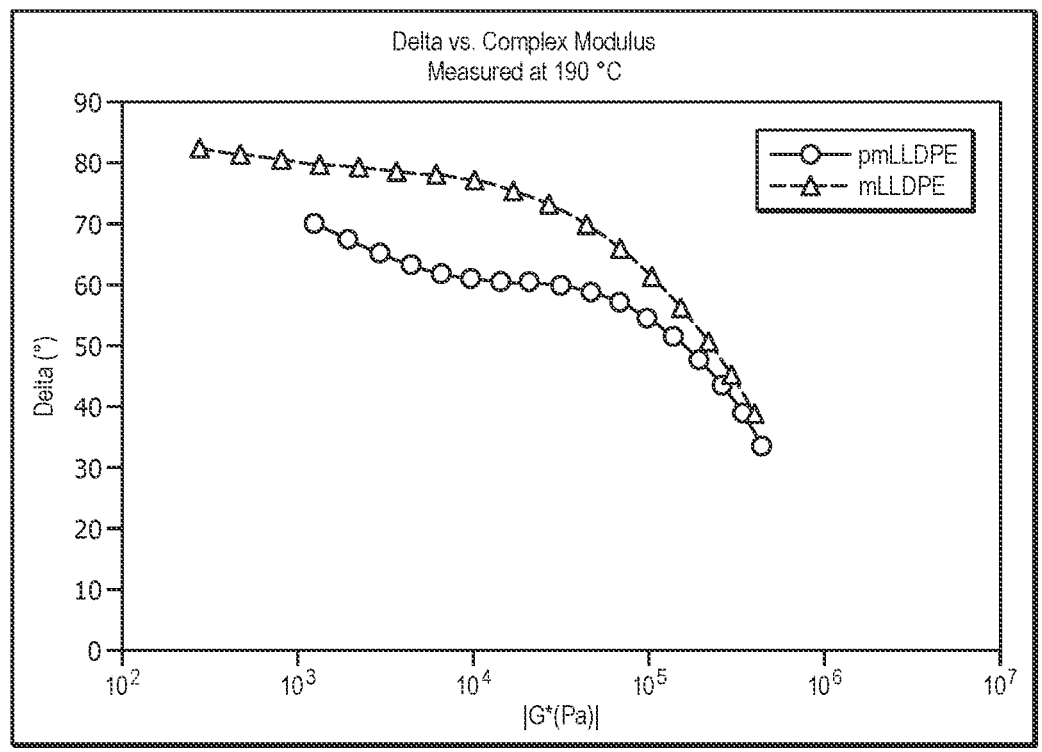
Figure 5C:
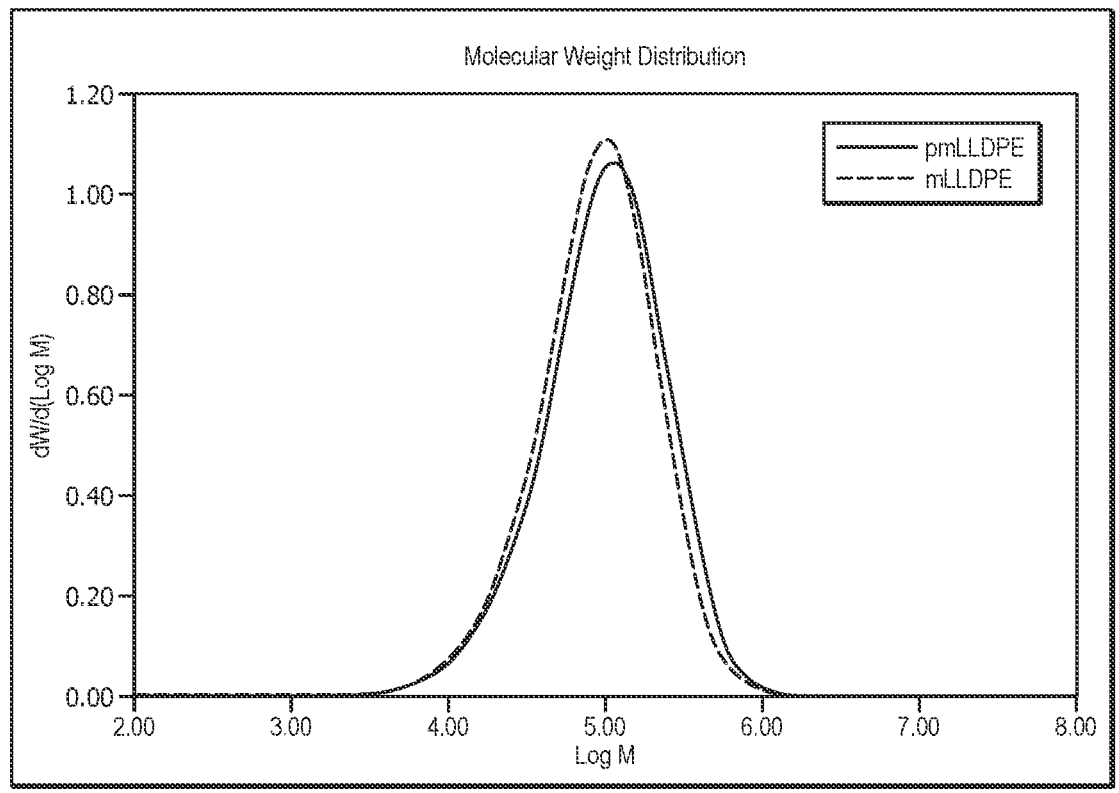

The properties of different linear low density polyethylene (LLDPE) samples were compared via rheology measurements, which were conducted via parallel plate oscillation. More specifically, the properties of mLLDPE having about the physical properties given in Table 3 (mLLDPE) were compared with the properties of pmLLDPE having about the physical properties given in Table 4 (pmLLDPE); and the data are displayed in Tables 8-10 and in FIGS. 5A, 5B, and 5C. Three different samples of pmLLDPE having about the physical properties given in Table 4 were tested: pmLLDPE#1, pmLLDPE#2, and pmLLDPE#3. The data in FIGS. 5A, 5B and 5C compare mLLDPE having about the physical properties given in Table 3 with pmLLDPE#1. Melt index (MI) represents the rate of flow of a molten resin through an orifice of 0.0825 inch diameter when subjected to a force of 2.16 kg at 190° C. as determined in accordance with ASTM D1238. High load melt index (HLMI) represents the rate of flow of a molten resin through an orifice of 0.0825 inch diameter when subjected to a force of 21.6 kg at 190° C. as determined in accordance with ASTM D1238. Ea is the flow activation energy calculated from the time-temperature superposition principle. HNGx is the crossover modulus (complex modulus at storage modulus=loss modulus) obtained by the Havriliak-Negami model. HNWx is the crossover frequency (frequency at storage modulus=loss modulus) obtained by the Havriliak-Negami model. Eta@MI is the viscosity at MI stress (1.97E4 Pa). Freq@MI is the frequency at MI stress (1.97E4 Pa). Eta@HLMI is the viscosity at HLMI stress (1.97E5 Pa). Freq@HLMI is the frequency at HLMI stress (1.97E5 Pa).

TABLE 8

| Sample | Eta_0 | Tau_eta | a_eta | n_eta | T(° C.) | Ea | MI | HLMI | HN Gx | HN Wx |
|---|---|---|---|---|---|---|---|---|---|---|
| pmLLDPE #1 | 2.54E+05 | 4.59E−02 | 1.43E−01 | 1.82E−01 | 190 | 0 | 0.38 | 12.85 | 4.21E+05 | 5.23E+02 |
| pmLLDPE #2 | 2.32E+05 | 4.02E−02 | 1.48E−01 | 1.82E−01 | 190 | 0 | 0.34 | 11.00 | 4.75E+05 | 5.38E+02 |
| pmLLDPE #3 | 2.24E+05 | 3.80E−02 | 1.50E−01 | 1.82E−01 | 190 | 0 | 0.33 | 10.57 | 4.96E+05 | 5.53E+02 |
| mLLDPE of Table 3 | 9.43E+03 | 7.00E−03 | 3.44E−01 | 1.82E−01 | 190 | 0 | 1.16 | 22.11 | 3.75E+05 | 5.33E+02 |

TABLE 9

| Sample | Eta @0.1 | Tand @0.1 | Eta @100 | Tand @100 | Eta@MI | Freq@MI | Eta@HLMI | Freq@HLMI |
|---|---|---|---|---|---|---|---|---|
| pmLLDPE #1 | 2.89E+04 | 2.32 | 2.51E+03 | 1.16 | 1.30E+04 | 1.52 | 3.05E+03 | 6.46E+01 |
| pmLLDPE #2 | 3.08E+04 | 2.41 | 2.78E+03 | 1.17 | 1.47E+04 | 1.34 | 3.65E+03 | 5.41E+01 |
| pmLLDPE #3 | 3.12E+04 | 2.44 | 2.86E+03 | 1.17 | 1.51E+04 | 1.30 | 3.83E+03 | 5.15E+01 |
| mLLDPE of Table 3 | 7.82E+03 | 10.23 | 2.09E+03 | 1.45 | 5.18E+03 | 3.81 | 2.17E+03 | 9.08E+01 |

TABLE 10

| Sample | Mn/1000 | Mw/1000 | Mz/1000 | Mv/1000 | Mp/1000 | Mw/Mn | Mz/Mw | Alpha* | LCB/1000 C |
|---|---|---|---|---|---|---|---|---|---|
| pmLLDPE #1 | 58.06 | 139.64 | 263.22 | 243.85 | 111.64 | 2.4 | 1.88 | 1.62E−05 | 1.62E−02 |
| pmLLDPE #2 | 52.6 | 137.75 | 269.5 | 248.64 | 108.92 | 2.62 | 1.96 | 1.63E−05 | 1.63E−02 |
| pmLLDPE #3 | 47.82 | 117.6 | 220.65 | 205.41 | 90.11 | 2.46 | 1.88 | 2.59E−05 | 2.59E−02 |
| mLLDPE of Table 3 | 55.86 | 125.13 | 239.73 | 220.6 | 100.97 | 2.24 | 1.92 | 2.87E−06 | 2.87E−03 |

*Alpha = Average number of branches per carbon atom

Generally, polymers may be characterized by their rheological breadth, for example as shown in Table 8. Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by equation 1:

$$E = E_o [1 + (T_\xi \dot{\gamma})^a]^{\frac{n-1}{a}} \qquad (1)$$

where
E=viscosity (Pa·s)
$\dot{\gamma}$=shear rate (1/s)
a=rheological breadth parameter
$T_\xi$=relaxation time (s) [describes the location in time of the transition region]
$E_0$=zero shear viscosity (Pa·s) [defines the Newtonian plateau]
n=power law constant [defines the final slope of the high shear rate region].

To facilitate model fitting, the power law constant is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

Eta_0 "eta zero" (zero shear viscosity or $E_0$) values, CY"a" values, and "tau eta" ($T_\xi$) values are determined when the dynamic complex viscosity versus frequency scan are fitted to the Carreau-Yasuda equation with an n=0.1818 value.

Example 4

The properties of different linear low density polyethylene (LLDPE) samples were compared. Polymer samples were tested via Gel Permeation Chromatography (GPC) to separate the polymer composition by means of size exclusion thereafter in series measured via infrared (IR) detector. The IR detector was an IR5 equipped with five filters set at different frequency ranges and a mercury-cadmium-telluride detector with thermoelectric cooling (TEC) capability. The filter was used to isolate certain frequency needed to make the short chain branching (SCB) determination, and the TEC was used to improve the signal to noise ratio. Specifically, the SCB content of mLLDPE having about the physical properties given in Table 3 was compared with the SCB content of pmLLDPE having about the physical properties given in Table 4 (pmLLDPE); and the data are displayed in Table 11. Rho is a dimensionless ratio of the z-averages of the radius of gyration RG and hydrodynamic radius RH.

TABLE 11

| Sample | Mn | Mw | Mz | Mp | PDI* | SCB | rho |
|---|---|---|---|---|---|---|---|
| mLLDPE of Table 3 | 44535 | 111724 | 235257 | 88021 | 2.51 | 13.82 | 0.918 |
| pmLLDPE of Table 4 | 40518 | 120484 | 235135 | 95001 | 2.97 | 14.4 | 0.915 |

*PDI = polydispersity index or molecular weight distribution (MWD).

Additional Disclosure

The following enumerated embodiments are provided as nonlimiting examples.

A first aspect, which is a composition comprising a low density polyethylene (LDPE) and a peroxide-treated metallocene-catalyzed linear low density polyethylene (pmLLDPE), wherein the composition when extruded as a molten resin displays a neck-in value that is (i) decreased when compared to the neck-in value observed when using the LDPE alone, (ii) about equal to the neck-in value observed when using the LDPE alone, or (iii) increased by less than about 10% of the neck-in value observed when using the LDPE alone.

A second aspect, which is the composition of the first aspect, wherein the composition when extruded as a molten resin displays a neck-in value that is decreased by equal to or greater than about 10% of the neck-in value observed when using the LDPE alone.

A third aspect, which is the composition of any one of the first and the second aspects, wherein the composition when extruded as a molten resin displays a neck-in value that is decreased by equal to or greater than about 25% of the neck-in value observed when using the LDPE alone.

A fourth aspect, which is the composition of any one of the first through the third aspects, wherein the composition when extruded as a molten resin displays a neck-in value that is decreased by equal to or greater than about 5% when compared with a neck-in value of an otherwise similar composition comprising the LDPE and a metallocene-catalyzed linear low density polyethylene (mLLDPE) that has not been peroxide-treated.

A fifth aspect, which is the composition of any one of the first through the fourth aspects, wherein the composition when extruded on an extruder as a molten resin provides for an extrusion pressure that is decreased by equal to or greater than about 2% when compared with an extrusion pressure provided on the same extruder by an otherwise similar composition comprising the LDPE and an mLLDPE that has not been peroxide-treated.

A sixth aspect, which is the composition of any one of the first through the fifth aspects, wherein the composition when extruded on an extruder as a molten resin provides for a motor load that is decreased by equal to or greater than about 4% when compared with a motor load provided on the same extruder by an otherwise similar composition comprising the LDPE and an mLLDPE that has not been peroxide-treated.

A seventh aspect, which is the composition of any one of the first through the sixth aspects, wherein the composition when formed into a coating has a thickness of from about 0.25 mil to about 4.0 mil.

An eighth aspect, which is the composition of any one of the first through the seventh aspects, wherein the composition has a blend compatibility rating of 1.

A ninth aspect, which is the composition of any one of the first through the eighth aspects, wherein the composition comprises from about 1 wt. % to about 80 wt. % pmLLDPE, based on the total weight of the composition.

A tenth aspect, which is the composition of any one of the first through the ninth aspects, wherein the pmLLDPE has a melt index of equal to or less than about 0.9 g/10 min, when tested in accordance with ASTM D1238 under a force of 2.16 kg.

An eleventh aspect, which is the composition of any one of the first through the tenth aspects, wherein the pmLLDPE has a density of from about 0.909 g/cc to about 0.919 g/cc, when tested in accordance with ASTM D1505.

A twelfth aspect, which is the composition of any one of the first through the eleventh aspects, wherein the pmLLDPE has a melting point of from about 105° C. to about 140° C., when tested in accordance with ASTM D3418.

A thirteenth aspect, which is the composition of any one of the first through the fourteenth aspects, wherein the pmLLDPE has a Vicat softening temperature of from about 85° C. to about 115° C., when tested in accordance with ASTM D1525.

A fourteenth aspect, which is the composition of any one of the first through the thirteenth aspects, wherein the pmLLDPE is characterized by a long chain branching (LCB) content of from about $7.5 \times 10^{-3}$ to about $3.00 \times 10^{-2}$ long chain branches per 1,000 carbon atoms.

A fifteenth aspect, which is the composition of any one of the first through the fourteenth aspects, wherein the pmLLDPE is characterized by a short chain branching (SCB) content of from about 10.0 to about 20.0 short chain branches per 1,000 carbon atoms.

A sixteenth aspect, which is the composition of any one of the first through the fifteenth aspects, wherein the pmLLDPE is characterized by an LCB to SCB ratio of from about $5.13 \times 10^{-4}$ to about $2.37 \times 10^{-3}$.

A seventeenth aspect, which is the composition of any one of the first through the sixteenth aspects, wherein the pmLLDPE has an $\eta_0$ (eta_0) of from about $1.50 \times 10^5$ Pa-s to about $3.50 \times 10^5$ Pa-s.

An eighteenth aspect, which is the composition of any one of the first through the seventeenth aspects, wherein the pmLLDPE has an $\eta_{100}$ (eta_100) of from about $1.77 \times 10^3$ Pa-s to about $3.60 \times 10^3$ Pa-s.

A nineteenth aspect, which is the composition of any one of the first through the eighteenth aspects, wherein the pmLLDPE is produced by peroxide treatment of an mLLDPE, and wherein the mLLDPE is produced using a single site metallocene.

A twentieth aspect, which is the composition of any one of the first through the nineteenth aspects, wherein the wherein the LDPE has a melt index of from about 10 g/10 min to about 20 g/10 min, when tested in accordance with ASTM D1238 under a force of 2.16 kg.

A twenty-first aspect, which is the composition of the twentieth aspect, wherein the composition when extruded as a molten resin displays a neck-in value that is decreased by equal to or greater than about 40% of the neck-in value observed when using the LDPE alone.

A twenty-second aspect, which is the composition of any one of the twentieth and the twenty-first aspects, wherein the composition when extruded on an extruder as a molten resin provides for a motor load that is decreased by equal to or greater than about 7.5% when compared with a motor load provided on the same extruder by an otherwise similar composition comprising the LDPE and an mLLDPE that has not been peroxide-treated.

A twenty-third aspect, which is the composition of any one of the first through the twenty-second aspects, wherein the LDPE has a density of from about 0.915 g/cc to about 0.920 g/cc, when tested in accordance with ASTM D1505.

A twenty-fourth aspect, which is the composition of any one of the first through the twenty-third aspects, wherein the LDPE has a melting point of from about 100° C. to about 105° C., when tested in accordance with ASTM D3418.

A twenty-fifth aspect, which is the composition of any one of the first through the twenty-fourth aspects, wherein the LDPE has a Vicat softening temperature of from about 85° C. to about 92° C., when tested in accordance with ASTM D1525.

A twenty-sixth aspect, which is the composition of any one of the first through the nineteenth aspects, wherein the LDPE has a melt index of from about 4.6 g/10 min to about 10 g/10 min, when tested in accordance with ASTM D1238 under a force of 2.16 kg.

A twenty-seventh aspect, which is the composition of the twenty-sixth aspect, wherein the composition when extruded on an extruder as a molten resin provides for a motor load that is decreased by equal to or greater than about 12.5% when compared with a motor load provided on the same extruder by an otherwise similar composition comprising the LDPE and an mLLDPE that has not been peroxide-treated.

A twenty-eighth aspect, which is the composition of any one of the twenty-sixth and the twenty-seventh aspects, wherein the composition when extruded on an extruder as a molten resin provides for an extrusion pressure that is decreased by equal to or greater than about 10% when compared with an extrusion pressure provided on the same extruder by an otherwise similar composition comprising the LDPE and an mLLDPE that has not been peroxide-treated.

A twenty-ninth aspect, which is the composition of any one of the first through the nineteenth aspects, wherein the LDPE has a density of from about 0.920 g/cc to about 0.924 g/cc, when tested in accordance with ASTM D1505.

A thirtieth aspect, which is the composition of any one of the first through the nineteenth aspects, wherein the LDPE has a melting point of from about 105° C. to about 110° C., when tested in accordance with ASTM D3418.

A thirty-first aspect, which is the composition of any one of the first through the nineteenth aspects, wherein the LDPE has a Vicat softening temperature of from about 92° C. to about 102° C., when tested in accordance with ASTM D1525.

A thirty-second aspect, which is an extrusion coating prepared from the composition of any one of the first through the thirty-first aspects.

A thirty-third aspect, which is a flexible packaging container comprising the composition of any one of the first through the thirty-first aspects.

A thirty-fourth aspect, which is a method comprising blending a low density polyethylene (LDPE) and a peroxide-treated metallocene-catalyzed linear low density polyethylene (pmLLDPE) to form a polyethylene blend having a blend compatibility rating of 1; wherein the polyethylene blend comprises from about 1 wt. % to about 80 wt. % pmLLDPE, based on the total weight of the polyethylene blend; wherein the polyethylene blend is characterized by a ΔMI of from about 4.5 to about 25; wherein the ΔMI is defined as the absolute value of the difference between the melt index (MI) of the LDPE and the MI of the pmLLDPE; wherein the MI is expressed in g/10 min, and wherein the MI is measured in accordance with ASTM D1238 under a force of 2.16 kg.

A thirty-fifth aspect, which is the method of the thirty-fourth aspect further comprising extruding the polyethylene blend as a molten resin; wherein the polyethylene blend when extruded as a molten resin displays a neck-in value that is (i) decreased when compared to the neck-in value observed when using the LDPE alone, (ii) about equal to the neck-in value observed when using the LDPE alone, or (iii) increased by less than about 10% of the neck-in value observed when using the LDPE alone.

A thirty-sixth aspect, which is the method of the thirty-fifth aspect, wherein the polyethylene blend when extruded as a molten resin displays a neck-in value that is decreased by equal to or greater than about 10% of the neck-in value observed when using the LDPE alone.

A thirty-seventh aspect, which is the method of any one of the thirty-fifth and the thirty-sixth aspects, wherein the polyethylene blend is characterized by a ΔMI of equal to or greater than about 10.

A thirty-eighth aspect, which is the method of the thirty-seventh aspect, wherein the LDPE has a melt index of greater than about 10 g/10 min, when tested in accordance with ASTM D1238 under a force of 2.16 kg; and wherein the pmLLDPE has a melt index of equal to or less than about 0.9 g/10 min, when tested in accordance with ASTM D1238 under a force of 2.16 kg.

A thirty-ninth aspect, which is the method of any one of the thirty-seventh and the thirty-eighth aspects, wherein the polyethylene blend when extruded as a molten resin displays a neck-in value that is decreased by equal to or greater than about 40% of the neck-in value observed when using the LDPE alone.

A fortieth aspect, which is the method of any one of the thirty-fourth through the thirty-ninth aspects, wherein the pmLLDPE has (A) a melt index of equal to or less than about 0.9 g/10 min, when tested in accordance with ASTM D1238 under a force of 2.16 kg; (B) a density of from about 0.909 g/cc to about 0.919 g/cc, when tested in accordance with ASTM D1505; (C) a melting point of from about 105° C. to about 140° C., when tested in accordance with ASTM D3418; (D) a Vicat softening temperature of from about 85° C. to about 115° C., when tested in accordance with ASTM D1525; (E) a long chain branching (LCB) content of from about $7.5 \times 10^{-3}$ to about $3.00 \times 10^{-2}$ long chain branches per 1,000 carbon atoms; (F) a short chain branching (SCB) content of from about 10.0 to about 20.0 short chain branches per 1,000 carbon atoms; (G) an $\eta_0$ (eta_0) of from about $1.50 \times 10^5$ Pa-s to about $3.50 \times 10^5$ Pa-s; (H) an $\eta_{100}$ (eta_100) of from about $1.77 \times 10^3$ Pa-s to about $3.60 \times 10^3$ Pa-s; or (I) any combination of (A)-(H).

A forty-first aspect, which is the method of any one of the thirty-fourth through the fortieth aspects further comprising contacting a metallocene-catalyzed linear low density polyethylene (mLLDPE) with from about 25 ppm to about 400 ppm of peroxide modifier, based on the total weight of the mLLDPE base resin to form the pmLLDPE.

A forty-second aspect, which is the method of the forty-first aspect further comprising polymerizing polyethylene with a single site metallocene catalyst to produce the mLLDPE.

A forty-third aspect, which is a method comprising extruding a polyethylene blend as a molten resin on an extruder to form an extrusion coating; wherein the polyethylene blend comprises a low density polyethylene (LDPE) and a peroxide-treated metallocene-catalyzed linear low density polyethylene (pmLLDPE); wherein the polyethylene blend has a blend compatibility rating of 1; wherein the LDPE has a melt index of greater than about 4.0 g/10 min, when tested in accordance with ASTM D1238 under a force of 2.16 kg; wherein the pmLLDPE has a melt index of equal to or less than about 0.9 g/10 min, when tested in accordance with ASTM D1238 under a force of 2.16 kg; and wherein the polyethylene blend when extruded as a molten resin displays a neck-in value that is (i) decreased when compared to the neck-in value observed when using the LDPE alone, (ii) about equal to the neck-in value observed when using the LDPE alone, or (iii) increased by less than about 10% of the neck-in value observed when using the LDPE alone.

A forty-fourth aspect, which is the method of the forty-third aspect further comprising coating the molten resin onto a substrate to form the extrusion coating; wherein the extrusion coating contacts the substrate.

A forty-fifth aspect, which is the method of the forty-fourth aspect, wherein the substrate comprises paper, paperboard, aluminum foil, cellulose, nonwovens, plastic film, or combinations thereof.

A forty-sixth aspect, which is the method of any one of the forty-third through the forty-fifth aspects, wherein the extrusion coating has a thickness of from about 0.25 mil to about 4.0 mil.

A forty-seventh aspect, which is the method of any one of the forty-third through the forty-sixth aspects, wherein the LDPE has a melt index of greater than about 10 g/10 min, when tested in accordance with ASTM D1238 under a force of 2.16 kg; and wherein the polyethylene blend when extruded as a molten resin displays a neck-in value that is decreased by equal to or greater than about 40% of the neck-in value observed when using the LDPE alone.

A forty-eighth aspect, which is the method of the forty-seventh aspect, wherein the extruder is characterized by a motor load that is decreased by equal to or greater than about 7.5% when compared with a motor load provided on the same extruder by an otherwise similar composition comprising the LDPE and a metallocene-catalyzed linear low density polyethylene (mLLDPE) that has not been peroxide-treated.

A forty-ninth aspect, which is the method of any one of the forty-third through the forty-sixth aspects, wherein the LDPE has a melt index of from about 4.0 g/10 min to about 10 g/10 min, when tested in accordance with ASTM D1238 under a force of 2.16 kg; and wherein the polyethylene blend when extruded as a molten resin displays a neck-in value that is increased by less than about 7.5% of the neck-in value observed when using the LDPE alone.

A fiftieth aspect, which is the method of the forty-ninth aspect, wherein the extruder is characterized by a motor load that is decreased by equal to or greater than about 12.5% when compared with a motor load provided on the same extruder by an otherwise similar composition comprising the LDPE and an mLLDPE that has not been peroxide-treated.

A fifty-first aspect, which is the method of any one of the forty-ninth and fiftieth aspects, wherein the extruder is characterized by an extrusion pressure that is decreased by equal to or greater than about 10% when compared with an extrusion pressure provided on the same extruder by an otherwise similar composition comprising the LDPE and an mLLDPE that has not been peroxide-treated.

A fifty-second aspect, which is a method comprising extrusion blending a low density polyethylene (LDPE) and a peroxide-treated metallocene-catalyzed linear low density polyethylene (pmLLDPE) to form a molten resin having a blend compatibility rating of 1; wherein the LDPE has a melt index of greater than about 10 g/10 min, when tested in accordance with ASTM D1238 under a force of 2.16 kg; and wherein the pmLLDPE has a melt index of equal to or less than about 0.9 g/10 min, when tested in accordance with ASTM D1238 under a force of 2.16 kg; and coating the molten resin onto a substrate to form an extrusion coating; wherein the extrusion coating contacts the substrate; and wherein the extrusion coating has a neck-in value that is decreased by equal to or greater than about 40% of the neck-in value observed when using the LDPE alone.

A fifty-third aspect, which is the method of the fifty-second aspect, wherein the extrusion blending and the coating are performed on the same extruder.

A fifty-fourth aspect, which is the method of any one of the fifty-second and the fifty-third aspects, wherein the extruder is characterized by a motor load that is decreased by equal to or greater than about 10% when compared with a motor load provided on the same extruder by an otherwise similar composition comprising the LDPE and a metallocene-catalyzed linear low density polyethylene (mLLDPE) that has not been peroxide-treated.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, and the like; greater than 0.10 includes 0.11, 0.12, 0.13, and the like). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^* (R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A composition comprising 60-80 wt. % of a low density polyethylene homopolymer (LDPE) and 20-40 wt. % of a peroxide-treated metallocene-catalyzed linear low density polyethylene (pmLLDPE), p1 wherein the LDPE has a melt index of 15-18 g/10 min when tested in accordance with ASTM D1238 under a force of 2.16 kg, a density of from about 0.917 g/cc to about 0.919 g/cc, when tested in accordance with ASTM D1505, a melting point of from about 100° C. to about 105° C., when tested in accordance with ASTM D3418, and a Vicat softening temperature of from about 85° C. to about 92° C., when tested in accordance with ASTM D1525, wherein the pmLLDPE has a melt index of 0.2-0.5 g/10 min when tested in accordance with ASTM D1238 under a force of 2.16 kg, a density of from about 0.912 g/cc to about 0.916 g/cc, when tested in accordance with ASTM D1505, a melting point of from about 105° C. to about 140° C., when tested in accordance with ASTM D3418, and a Vicat softening temperature of from about 85° C. to about 115° C., when tested in accordance with ASTM D1525, a long chain branching (LCB) content of from about $7.5 \times 10^{-3}$ to about $3.00 \times 10^{-2}$ long chain branches per 1,000 carbon atoms, a short chain branching (SCB) content of from about 10.0 to about 20.0 short chain branches per 1,000 carbon atoms, or both an LCB content of from about $7.5 \times 10^{-3}$ to about $3.00 \times 10^{-2}$ long chain branches per 1,000 carbon atoms and an SCB content of from about 10.0 to about 20.0 short chain branches per 1,000 carbon atoms, wherein the composition when extruded as a molten resin displays a neck-in value that is decreased by equal to or greater than about 50% of the neck-in value observed when using the LDPE alone, wherein the composition when extruded on an extruder as a molten resin provides for a motor load that is decreased by equal to or greater than about 7.5% when compared with a motor load provided on the same extruder by an otherwise similar composition comprising the LDPE and an mLLDPE that has not been peroxide-treated and wherein the composition has a blend compatibility rating of 1.

2. The composition of claim 1, wherein the composition when extruded on an extruder as a molten resin provides for an extrusion pressure that is decreased by equal to or greater than about 2% when compared with an extrusion pressure provided on the same extruder by an otherwise similar composition comprising the LDPE and an mLLDPE that has not been peroxide-treated.

3. The composition of claim 1, wherein the pmLLDPE has an $\eta_0$ (eta_0) of from about $1.50\times10^5$ Pa·s to about $3.50\times10^5$ Pa·s, an $\eta_{100}$ (eta_100) of from about $1.77\times10^3$ Pa·s to about $3.60\times10^3$ Pa·s, or both an $\eta_0$ (eta_0) of from about $1.50\times10^5$ Pa·s to about $3.50\times10^5$ Pa·s and an $\eta_{100}$ (eta_100) of from about $1.77\times10^3$ Pa·s to about $3.60\times10^3$ Pa·s.

4. The composition of claim 1, wherein the composition when extruded on an extruder as a molten resin provides for a motor load that is decreased by equal to or greater than about 12.5% when compared with a motor load provided on the same extruder by an otherwise similar composition comprising the LDPE and an mLLDPE that has not been peroxide-treated.

5. The composition of claim 1, wherein the composition when extruded on an extruder as a molten resin provides for an extrusion pressure that is decreased by equal to or greater than about 10% when compared with an extrusion pressure provided on the same extruder by an otherwise similar composition comprising the LDPE and an mLLDPE that has not been peroxide-treated.

6. The composition of claim 2, wherein the pmLLDPE has an $\eta_0$ (eta_0) of from about $1.50\times10^5$ Pa·s to about $3.50\times10^5$ Pa·s, an $\eta_{100}$ (eta_100) of from about $1.77\times10^3$ Pa·s to about $3.60\times10^3$ Pa·s, or both an $\eta_0$ (eta_0) of from about $1.50\times10^5$ Pa·s to about $3.50\times10^5$ Pa·s and an $\eta_{100}$ (eta_100) of from about $1.77\times10^3$ Pa·s to about $3.60\times10^3$ Pa·s.

7. The composition of claim 2, wherein the composition when extruded on an extruder as a molten resin provides for a motor load that is decreased by equal to or greater than about 12.5% when compared with a motor load provided on the same extruder by an otherwise similar composition comprising the LDPE and an mLLDPE that has not been peroxide-treated.

8. The composition of claim 3, wherein the composition when extruded on an extruder as a molten resin provides for a motor load that is decreased by equal to or greater than about 12.5% when compared with a motor load provided on the same extruder by an otherwise similar composition comprising the LDPE and an mLLDPE that has not been peroxide-treated.

9. The composition of claim 6, wherein the composition when extruded on an extruder as a molten resin provides for a motor load that is decreased by equal to or greater than about 12.5% when compared with a motor load provided on the same extruder by an otherwise similar composition comprising the LDPE and an mLLDPE that has not been peroxide-treated.

10. The composition of claim 2, wherein the composition when extruded on an extruder as a molten resin provides for an extrusion pressure that is decreased by equal to or greater than about 10% when compared with an extrusion pressure provided on the same extruder by an otherwise similar composition comprising the LDPE and an mLLDPE that has not been peroxide-treated.

11. The composition of claim 3, wherein the composition when extruded on an extruder as a molten resin provides for an extrusion pressure that is decreased by equal to or greater than about 10% when compared with an extrusion pressure provided on the same extruder by an otherwise similar composition comprising the LDPE and an mLLDPE that has not been peroxide-treated.

12. The composition of claim 4 wherein the composition when extruded on an extruder as a molten resin provides for an extrusion pressure that is decreased by equal to or greater than about 10% when compared with an extrusion pressure provided on the same extruder by an otherwise similar composition comprising the LDPE and an mLLDPE that has not been peroxide-treated.

13. The composition of claim 6, wherein the composition when extruded on an extruder as a molten resin provides for an extrusion pressure that is decreased by equal to or greater than about 10% when compared with an extrusion pressure provided on the same extruder by an otherwise similar composition comprising the LDPE and an mLLDPE that has not been peroxide-treated.

14. The composition of claim 7, wherein the composition when extruded on an extruder as a molten resin provides for an extrusion pressure that is decreased by equal to or greater than about 10% when compared with an extrusion pressure provided on the same extruder by an otherwise similar composition comprising the LDPE and an mLLDPE that has not been peroxide-treated.

15. The composition of claim 8, wherein the composition when extruded on an extruder as a molten resin provides for an extrusion pressure that is decreased by equal to or greater than about 10% when compared with an extrusion pressure provided on the same extruder by an otherwise similar composition comprising the LDPE and an mLLDPE that has not been peroxide-treated.

16. The composition of claim 9, wherein the composition when extruded on an extruder as a molten resin provides for an extrusion pressure that is decreased by equal to or greater than about 10% when compared with an extrusion pressure provided on the same extruder by an otherwise similar composition comprising the LDPE and an mLLDPE that has not been peroxide-treated.

17. An extrusion coating prepared from the composition of claim 1.

18. The coating of claim 17 having a thickness of from about 0.25 mil to about 4.0 mil.

19. The coating of claim 18 having a seal initiation temperature of from about 90° C. to about 100° C.

* * * * *